United States Patent [19]
Kubota

[11] Patent Number: 6,041,323
[45] Date of Patent: Mar. 21, 2000

[54] INFORMATION SEARCH METHOD, INFORMATION SEARCH DEVICE, AND STORAGE MEDIUM FOR STORING AN INFORMATION SEARCH PROGRAM

[75] Inventor: Rie Kubota, Yokohama, Japan

[73] Assignee: International Business Machines Corporation, Armonk, N.Y.

[21] Appl. No.: 08/837,346

[22] Filed: Apr. 17, 1997

[30] Foreign Application Priority Data

Apr. 17, 1996 [JP] Japan ..................................... 8-095691

[51] Int. Cl.⁷ ....................................................... G06F 17/30
[52] U.S. Cl. ..................................................... 707/5; 707/3
[58] Field of Search ......................................... 707/3, 4, 5

[56] References Cited

U.S. PATENT DOCUMENTS

| | | | |
|---|---|---|---|
| 5,404,514 | 4/1995 | Kageneck et al. | 707/3 |
| 5,488,725 | 1/1996 | Turtle et al. | 707/4 |
| 5,640,553 | 6/1997 | Schultz | 707/5 |
| 5,649,185 | 7/1997 | Antognini et al. | 707/9 |
| 5,737,734 | 4/1998 | Schultz | 707/5 |
| 5,742,816 | 4/1998 | Barr et al. | 707/3 |
| 5,745,745 | 4/1998 | Tada et al. | 707/3 |
| 5,765,150 | 6/1998 | Burrows | 707/5 |
| 5,794,237 | 8/1998 | Gore, Jr. | 707/3 |
| 5,826,261 | 10/1998 | Spencer | 707/5 |

*Primary Examiner*—Thomas G. Black
*Assistant Examiner*—Frantz Coby
*Attorney, Agent, or Firm*—Sughrue, Mion, Zinn Macpeak & Seas, PLLC

[57] ABSTRACT

A system and a method for searching does not rely on prior compiled vocabulary information or grammatical information to perform a search. The search may accommodate new words or phrases, and perform a document search using a request of a user for document search. A unique character string is extracted from an input document and a similarity search is performed by using the unique character string. The extraction of the unique character string is performed by calculating and evaluating an amount of feature of a character string through comparison between appearance frequency appearing in the input document and appearance frequency in a set of documents to be searched. Then, the extracted unique character string is used as the basis for the search. Documents found by the search are evaluated and arranged in the order of evaluation. The similarity factor of document is evaluated by using the appearance frequency of each unique character string in the input document so that higher evaluation is provided to a document in which unique character strings with higher weight appears many times.

19 Claims, 14 Drawing Sheets

INFORMATION SEARCH METHOD, INFORMATION SEARCH DEVICE, AND STORAGE MEDIUM FOR STORING AN INFORMATION SEARCH PROGRAM

BACKGROUND OF THE INVENTION

1. Field of the Invention

The present invention relates to a system and method for searching a large volume of documents stored in a computer. More particularly, the invention relates to a system and method for searching for stored documents that are similar to a document having one or more particular string characteristics at a high speed while allowing desired ambiguity in the search of the stored documents.

2. Background Art

In known search methods for locating a document of interest from a set of electronic document texts, it is common practice to input a search expression in which character strings indicative of the subject matter of interest are connected by logical operators such as AND, OR, or NOT. An example of a search expression follows.

(computer OR personal computer) AND search

This method gives all operation and discretion to the user in converting the subject matter of interest into the search expression. It is often troublesome to formulate suitable search character strings and to input the suitable search expression. In addition, the quality of the search results greatly depends on skill of the user in constructing the search expression.

A method is also known where each search character string of the search expression is weighted according to importance of the string. A result of such a search comprises sequentially output documents corresponding to those containing higher weight of the search character strings. An example of a weighted search expression follows.

Computer, 60 personal computer, 60 search, 100

Like the first conventional method, this weighting method also gives all operation and discretion for converting the subject matter of interest to the search expression to the user. The above methods further require the user to fully understand the contents of documents to be searched and the terms being used in the search expression. Therefore, if a user vaguely thinks "I want to read sentences with such sense", it is difficult to construct a meaningful search expression from this general statement.

On the other hand, there is a technology as described in Published Unexamined Patent Application (PUPA) No. 6-124305 to is input natural language expressions for a search, to extract search keys, and to perform the search based on the extracted search keys. Such a search requires a search key dictionary. In a method performing extraction based on vocabulary information (word dictionary) such as the search key dictionary or grammatical connection rules, the word dictionary or the grammatical connection rules are generally non-dynamic. Therefore, a new word such as "TOYSARUS" ("TOYSARUS" is a trademark of Toysarus Inc.) or a phrase such as "footprint of dinosaur" cannot be extracted as a unique character string without great difficulty. In addition, the concepts or perceived "features" of the contents of a document may change over time. For example, in the past, white-collar workers always wore suits when they came to the office. More recently, there are many cases where white-collar workers may not wear suits because many companies have adopted a "casual day" system. To keep pace with such changes, it is necessary to continuously update the word dictionary to include new words, new trademarks, trade name, and product names, etc. However, such updating requires enormous labor, and the region for storing the word dictionary or the like is increased as new words as added. This, in turn, would adversely affect search speed.

In addition, PUPA 6-223114 describes a method for processing character strings based on the frequency of the appearance of a word. However, such technology is used to determine the type of a document, or to extract keywords for a search by searching a registered word list (word dictionary) to determine whether words in the document exist in the word dictionary. Unlike these conventional search methods, the present invention investigates the frequency of the appearance of a word or character string in an input document and a comparison document, and utilizes the frequency of appearance in both of them. (In the word list-based method, one word appears only once in the dictionary so that it is meaningless to investigate the frequency of appearance in the list). Accordingly, in PUPA 6-223114, a stationary word dictionary is still necessary so that there still remains the above-mentioned problem that a new word or phrase cannot be easily extracted as a unique character string. In addition, since the known technology detects keywords based on stationary word dictionaries by category, if there are multiple documents describing "methods for searching documents" for example, there is a high possibility that the keywords being extracted are very similar ones such as "search", "character string", and "high speed". Therefore, it is difficult to extract keywords for differentiating each document, introducing inefficiencies in the search document.

An object of the present invention is build a search system which enables the user to a input a complicated search concept with a very simple operation, such as the clicking of a button, without requiring the user to think up or to input a search expression.

Another object of the present invention is to provide a search method which parallels a human thought process to enable a user to easily input complicated and abstract concepts for a search.

Another object of the present invention is to provide a search method which reduces labor of the user to think up or to input a search character string or a search expression, to provide a search method which can be easily used by everybody, and enables a user to perform search even if the user does not accurately understand a keyword to be used for the search.

Another object of the invention is to provide a search method which relatively and dynamically extracts a unique character string without using vocabulary information or grammar information.

Another object of the present invention is to provide a search method which requires less storage capacity and extracts a unique character string at a high speed.

SUMMARY OF THE INVENTION

The present invention solves the above problems by 1) extracting a unique character string (a character string characterizing the sentence when viewing the character string with respect to the entire set of documents) from an input sentence; 2) allocating a suitable matching factor to each unique character string for an ambiguity search; and 3) evaluating the located documents of a search request by using appearance frequency information in the input sentence as a weight factor, and rearranging the located documents in the order of evaluation.

"Input sentence" described herein means one or more sentences in a language such as Japanese or English, and may comprise the entire content of a sentence or a paragraph. In addition, it may be a sentence in which multiple languages such as Japanese and English are intermixed.

The "unique character string" means a character string characterizing the sentence when viewing the character string with respect to the entire set of documents, or comparing it with another sentence. To provide an analogy, the unique characteristic string corresponds to a word(s) in a input sentence in the same way that a physical feature corresponds to a person to distinguish the person from other individuals in a group. If most people in a group wear glasses, then the feature "wearing glasses" is not the feature of a specific person. On the other hand, if most people in a group are in casual clothes and a specific person wears a suit, then the feature "wearing a suit" is a significant feature of that person.

A unique character string extracted from the input sentence is weighted by the appearance frequency information of the unique character string. An ambiguous search is made based on the weighted unique character string. When a set of sentences are previously arranged as an index file by extracting appearance position information of N-character chains, a high speed search can be performed with reference to character strings in a document. Since extraction of word by morpheme analysis is not performed, "dictionary maintenance" is unnecessary, documents can be registered at a high speed, and ambiguity search can be performed for searching character strings in stored documents with a similar arrangement of characters as the unique character string.

An aspect of the present invention provides a method for identifying a unique character string contained in an input document which is input into a computer system, said computer system being operable to search comparison documents stored in a storage medium, the method comprising:

associating and managing position information for a position in the comparison document where a partial comparison document character string extracted from the comparison document exists with the partial comparison document character string;

extracting a partial input character string from the input document, and determining whether the partial input character string is candidate character string; identifying a partial comparison document character string which coincides with a part of the candidate character string at a predetermined similarity factor or higher;

identifying position data associated with the partial comparison document character string which coincides with the predetermined similarity factor; and recognizing the candidate character string as the unique character string by comparing appearance frequency information on a part of the candidate character string appearing in the input document with the position data, and evaluating an amount of feature of the candidate character string. When such a unique character string is recognized, the type of the document can be intuitively understood.

"Comparison document stored in the storage medium" described herein includes not only a document stored in a storage device in the computer system, but also a document stored in another system but searchable by this computer. In addition, the comparison document may be a single document, or multiple documents, or parts of single or multiple documents (e.g., a title, a body excluding the title, a footnote or the like). Moreover, in the case of multiple documents, it may be a set of documents including the input document, or a set of document extracted by search or the like. The contents of document may be of a natural language or a program language.

In addition, "input document" includes not only an entire document in a natural or program language stored in the storage device in the computer, but also a document which is stored in another system, but parts of which are extracted and input in this computer. In addition, the document may be a single document, or multiple documents, or parts of single or multiple documents. Moreover, the input document may be extracted parts of the comparison document.

"A partial input character string being extracted from the input document" may be not only a fixed character string of N characters of a non-delimiter language (N is a natural number of 1 or more) or a variable character string of N or more characters of a non-delimiter language, but also one or more words of a delimiter language. The partial input character string may comprise keywords extracted from the input document based on the vocabulary information (word dictionary) or the grammatical connection rules, but is not necessarily extracted from such information.

"A part of the candidate character string" may include all of a candidate character string, while "appearance frequency information" means information relating to the number of appearances of a part of the candidate character string in the input document, the comparison document or the like, and may be not only the number of appearances derived by investigating all of a document, but also information based on the number of appearance in a sample of each document. In addition, as described with respect to a preferred embodiment of the present invention, appearance frequency information may be information which is a value relating to the number of appearances in the document, the value including a size of position information data (size of position information file shown in FIG. 3 in bytes) corresponding to the N-character chain in the candidate character string quantized to Q level (Q is a constant), or a value which corresponds to such value as compressed.

"Associating and managing position information for a position in the comparison document with a partial comparison document character string" is desirably management by a position information file as shown in FIG. 3 of the preferred embodiment of the present invention. However, management may be implemented by using a table or information for pointing to an information storage position as long as the position information in the comparison document is associated with the partial comparison document character string and managed.

Although "an amount of feature" corresponds to points of the candidate character string as indicated in the preferred embodiment of the present invention, the concept is not limited to such. During calculation of points of a candidate character string, it may be possible to detect that the candidate character string satisfies a criterion such that it is recognized as a unique character string, and to recognize the string as a unique character string based on this criterion.

For "evaluating an amount of feature", it is possible to set various conditions such as a case where upper X character strings with a high amount of feature (becoming a feature of input document) are evaluated as the unique character string of the input document in question, a case where a candidate character string with an amount of feature exceeding a threshold is evaluated as the unique character string of the input document in question, or a case where a candidate character string including upper X character string and having an amount of feature exceeding a threshold is evaluated as the unique character string of the input document in question. The identified unique character string may be used for search as is, or further selected by other conditions (for example, adopted or rejected based on the degree of overlapping in the input document).

Another aspect of the present invention provides a method for searching for a comparison document, which has character strings similar to a partial input character string existing in an input document. The search is performed on a plurality of documents to be searched which are searchably stored in a computer, the method comprising: extracting a partial character string from the input document, and determining whether the partial character string is a candidate character string;

evaluating an amount of feature of the candidate character string through comparison between appearance frequency information on a part of the candidate character string appearing in the input document and appearance frequency information on a part of the candidate character string appearing in the comparison document to recognize the candidate character string as a unique character string; and searching a document to be searched having character strings similar to the unique character string from the plurality of documents to be searched.

"Character strings similar to the unique character string" means character strings resembling the unique character string with a predetermined similarity factor or higher, including a character string with a similarity factor of 100%, or complete matching. "Search" described herein includes not only a search method for an ambiguity search described in the preferred embodiment of the present invention, but also any and all search methods which can search a document from character strings.

"Comparison between appearance frequency information" described herein is calculated based on "appearance frequency information in input document/appearance frequency information in comparison document" as the simplest example, but may be replaced by various calculation formulae as described in the preferred embodiment of the invention.

Another aspect of the present invention provides a method for identifying a unique character string contained in an input document which is input into a computer system, said computer system being able to search a comparison document stored in a storage medium, the method comprising:

extracting a partial input character string from the input document, and determining whether the partial input character string is a candidate character string; and evaluating an amount of feature of the candidate character string through comparison between appearance frequency information on a part of the candidate character string appearing in the input document and appearance frequency information on a part of the candidate character string appearing in the comparison document to recognize the candidate character string as a unique character string.

Another aspect of the present invention provides a method for evaluating similarity between a comparison document and an input document which contains a first unique character string and a second unique character string input in a computer system, said computer system being operable to search a comparison document stored in a storage medium, the method comprising the steps of: calculating a first weight value corresponding to the first unique character string from appearance frequency information on a part of the first unique character string appearing in the input document;

calculating a second weight value corresponding to the second unique character string from appearance frequency information on a part of the second unique character string appearing in the input document;

calculating a first appearance frequency value on a part of the first unique character string appearing in the is comparison document;

calculating a second appearance frequency value on a part of the second unique character string appearing in the comparison document; and calculating the similarity factor of the comparison document from the first appearance frequency value taking the first weight value into account and the second appearance frequency value taking the second weight value into account.

Another aspect of the present invention provides an apparatus for evaluating similarity between a comparison document and a unique character string input in a computer system, said computer system being able to search a comparison document stored in a storage medium, the apparatus comprising:

means for calculating a weight value corresponding to the unique character string from appearance frequency information on a part of the unique character string appearing in the input document; and means for calculating the similarity factor of the comparison document from the appearance frequency information on a part of the unique character string appearing in the comparison document.

Another aspect of the present invention provides an apparatus for identifying a unique character string contained in an input document which is input into a computer system, said computer system containing a comparison document searchably stored by the computer, the apparatus comprising:

a storage device for storing a position information file which associates and manages position information for a position in the comparison document where a partial comparison document character string extracted from the comparison document exists with the partial comparison document character string;

extracting means for extracting a candidate character string from the input document;

means receiving an output of the extracting means, for identifying a partial comparison document character string which matches a part of the candidate character string with a predetermined similarity factor or higher;

means for identifying position information which is associated with the partial comparison document character string with the predetermined similarity factor or higher in the position information file; and means for recognizing the candidate character string as the unique character string by comparing appearance frequency information on a part of the candidate character string appearing in the input document with the position information, and evaluating an amount of feature of the candidate character string.

Another aspect of the present invention provides an apparatus for searching a document to be searched, said document having a character string similar to a partial input character string which exists in an input document input in a computer, said document being searched from a plurality of documents which are searchably stored in the computer, the apparatus comprising:

an input device for identifying the input document and for instructing execution of search; means for detecting from the input device the fact that the input document is identified and that the instruction of search is input;

means for extracting a candidate character string from the input document in response to the detection of the condition that the input document is identified and that the instruction of search is input;

means for calculating an amount of feature through comparison between appearance frequency information on a part of the candidate character string appearing in the input document and appearance frequency information on a part of the candidate character string appearing in the comparison document;

means for determining the candidate character string as a unique character string by evaluating the amount of feature; means for searching the document to be searched having a character string similar to the unique character string from a plurality of documents to be searched; and a display device for displaying the document to be searched having a character string similar to the unique character string.

Another aspect of the present invention provides an apparatus for identifying a unique character string contained in an input document which is input into a computer system, said computer system containing a comparison document searchably stored by the computer, the apparatus comprising:

means for extracting a candidate character string from the input document; and means for determining the candidate character string as a unique character string by evaluating an amount of feature of the candidate character string through comparison between appearance frequency information on a part of the candidate character string appearing in the input document and appearance frequency information on a part of the candidate character string appearing in the comparison document.

Another aspect of the present invention provides an apparatus for evaluating similarity between a comparison document and an input document containing a unique character string input into a computer system, said computer system containing a comparison document searchably stored by the computer, the apparatus comprising:

means for calculating a weight value corresponding to the unique character string from appearance frequency information on a part of the unique character string appearing in the input document; and means for calculating a similarity factor of the comparison document from appearance frequency information on a part of the unique character string appearing in the comparison document and the weight value.

Another aspect of the present invention provides a storage medium readable by a computer for storing a program which identifies an input document input into a computer system, said computer system containing a comparison document searchably stored by the computer, the program comprising:

program code means for directing the computer to extract a partial character string from the input document and making the partial character string a candidate string; and program code means for directing the computer to determine whether the candidate character string is a unique character string by evaluating an amount of feature of the candidate character string through comparison between appearance frequency information on a part of the candidate character string appearing in the input document and appearance frequency information on a part of the candidate character string appearing in the comparison document.

The storage medium includes a floppy disk, a CD-ROM, an MO, a PD or a storage device connected to a network. The program code may be divided into a plurality of segments and stored in a plurality of media. In addition, the program may be compressed and stored in a floppy disk. The medium is loaded on the system through various drives such as a floppy disk drive, a modem, or a serial port.

Another aspect of the present invention provides a storage medium readable by a computer for storing a program which evaluates similarity between a comparison document and an input document containing a unique character string input into a computer system, said computer system containing a comparison document searchably stored by the computer, the program comprising:

program code means for directing the computer to calculate a weight value corresponding to the unique character string from appearance frequency information on a part of the unique character string appearing in the input document; and program code means for directing the computer to calculate a similarity factor of the comparison document from the appearance frequency information on a part of the unique character string appearing in the comparison document and the weight value.

DESCRIPTION OF THE DRAWINGS

A preferred embodiment of the present invention will be explained with reference to the drawings, where.

DESCRIPTION OF THE PREFERRED EMBODIMENT

A. Hardware Configuration

Figure 1:
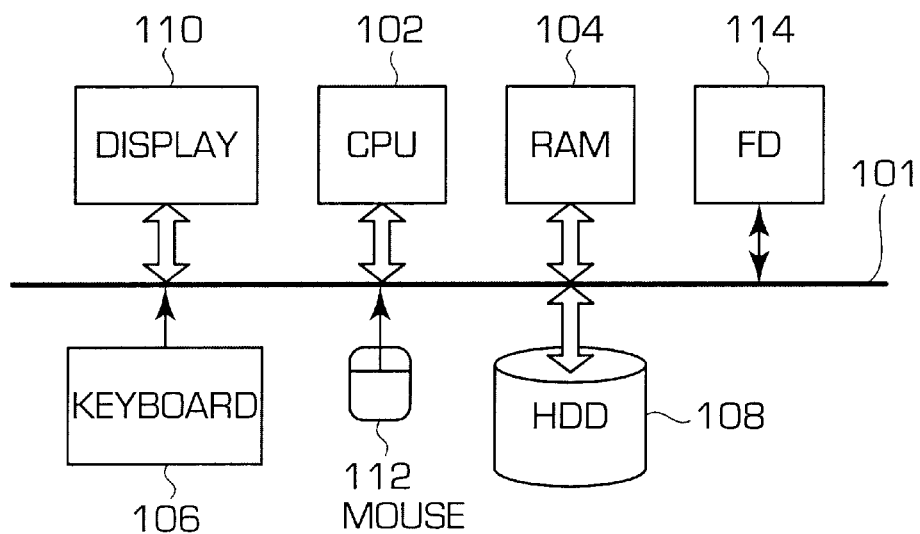
FIG. 1 is a block diagram showing a hardware configuration of a preferred embodiment of the present invention.

Referring to FIG. 1, there is shown a schematic view of a system configuration for implementing the present invention. In the configuration, a bus 101 is connected to a central processing unit (CPU) 102 having capabilities of arithmetic operation and input/output control, a main memory (RAM) 104 for loading a program and providing an operating environment for the CPU 102, a keyboard 106 for key inputting a command or a character string to be searched, a hard disk 108 storing an operating system, a database file, a search engine, an index file or the like, a display device 110 for displaying the result of search for the database, and a pointing device (including a mouse or a track ball) 112 for pointing to any location on the screen and transmitting its position information.

Therefore, it can be easily understood that the present invention can be implemented on an ordinary personal computer (PC), a workstation, or combination thereof. In addition, there is shown a storage medium 114 for storing program codes which provide instructions to the CPU or the like in cooperation with an operating system to implement the method of the present invention. The storage medium may include a floppy disk, a CD-ROM, an MO, a PD, and a storage device connected to a network. The program codes may be divided into a plurality of segments or compressed, and stored in a plurality of media. The storage medium 114 is loaded on the system through various drives such as a floppy disk drive, a modem, or a serial port, whereby the system shown in FIG. 1 is constituted as the system of the present invention.

The operating system is desirably those supporting a GUI multiwindow environment as a standard feature such as Windows (trademark of Microsoft), OS/2 (trademark of IBM) or X-Window system on AIX (trademark of IBM), but may be implemented on a character base environment such as PC-DOS (trademark of IBM) or MS-DOS (registered trademark of Microsoft). The invention is not limited to a specific operating system environment. In addition, while FIG. 1 shows a system in stand alone environment, because the database file generally requires a disk device with a large capacity, it may be possible to implement the present invention as a client/server system in which the database file and the search engine are placed on the server machine, and the client machine is LAN connected to the server machine through Ethernet or token ring, and arranged to have only an input control function for identifying an input document and a display controller for viewing the result of search.

B. System Configuration

Figure 2:
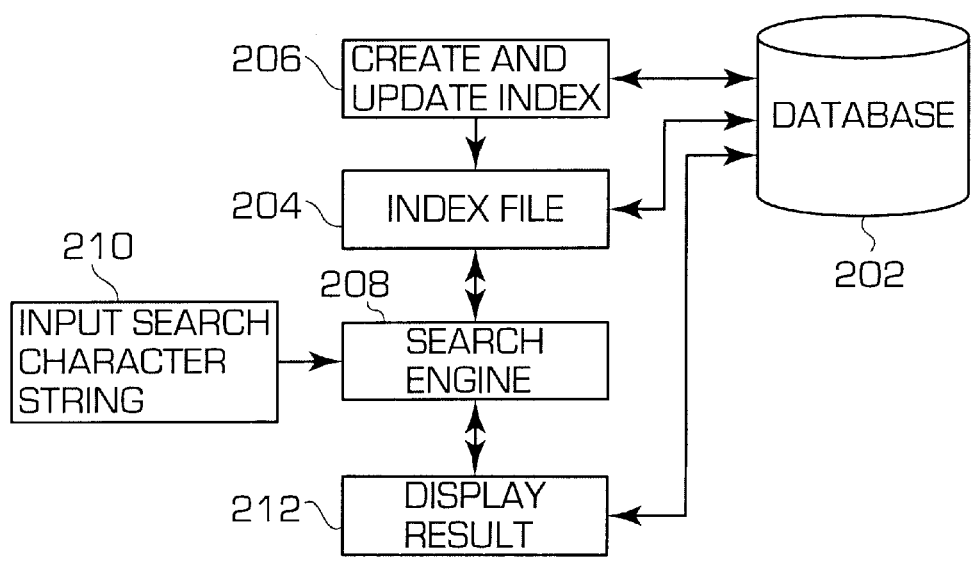
FIG. 2 is a block diagram of the system configuration processing components for the hardware of FIG. 1.

Referring to FIG. 2, a system configuration of the present invention is described. It should be noted that components represented by respective blocks in FIG. 2 are separately or collectively stored as a data file or program file in the hard disk 108 of FIG. 1. Database 202 stores a plurality of documents such as a database of newspaper accounts, or a database of patent publications. However, it should be noted the application of the present invention is not limited to search of a database consisting of a plurality of documents, but includes searching in a single document.

Contents of individual documents are searchably stored, for example, in a text file form. In addition, each document is provided with a unique document number. While preferable document numbers are ascending sequential numbers starting with 1, in the case of a patent publication database, application numbers or laid-open numbers may be used as unique document numbers. In addition, symbols such as "AB" or "&XYZ" may be used to identify individual documents in place of the sequential number. However, since such identification symbols generally require more bytes than numeric identifiers, it is preferable in practice to identify documents with the sequential numbers.

A preferred embodiment of the present invention can attain a high speed search for a document written in either a language which has a large number of characters, but does not have an explicit word delimiter such as Japanese and Chinese (non-delimiter language), or a language which has relatively small number of characters, and is expressed with explicit delimiters such as English (delimiter language).

In general, since it takes a long processing time to directly search enormous contents such as news articles or patent specifications stored in the database 202, an index file 204 is previously created by an index creation/update module 206 for the contents of all news articles. According to an embodiment of the present invention, the created index file comprises four files including a character chain file, a position information file, an extended character chain file, and an extended position information file.

Where the character chain file stores fixed length chains and delimiter patterns, the position information file comprises position numbers in the document and document numbers corresponding thereto. The extended character chain file stores extended fixed length chains, and the extended position information file stores variable length chain numbers and position numbers in the variable length chain. In the preferred embodiment of the present invention, search can be performed at a high speed by using such search files. However, since appearance frequency of a character string can be calculated regardless of the format for storing the document, use of such a search file is not an essential requirement of the present invention.

In addition, the database 202 may store individual documents as separate files, or may sequentially arrange all documents in a consecutive single file. In the former case, the database 202 manages a table which causes the unique numbers for individual documents to correspond to actual file names storing the documents. In the latter case, the database 202 manages a table which causes the unique numbers for individual documents to correspond to offset in the single database file and the size of document. In summary, it is essential that individual documents are provided with unique numbers, and the content of individual documents can be accessed with such unique numbers.

A search engine 208 has capabilities to search the index file 204 with a search character string given by a search character input module 210 as an input, and to return a document number(s) of the document(s) containing the input search character string and a position(s) at which the input search character string appears in the document. The search character input module 210 preferably consists of a dialog box in the multiwindow environment, where the desired character(s) to be searched is input through the keyboard 106 and displayed in the input box. According to a feature of the present invention, the search character input module 210 identifies an input document from which a unique character string is extracted. Specifically, titles of input documents are displayed on a display screen, and when the user selects a title with the pointer of the pointing device 112 such as a mouse, the system recognizes that a document corresponding to the displayed title is selected. The input document may be specified by directly entering information sufficient to identify the document to be input through the keyboard 106.

In addition, the search character string input module 210 can set the amount of feature of a unique character string (extracting a candidate character string as a unique character string when the points of the candidate character string exceeds a preset threshold) to be described later, or the number of character strings in a unique character string (extracting candidate character strings as the unique character string from those with higher point values). Furthermore, the search character string input module 210 enables input of the similarity factor for an ambiguity search in a numerical value of 0–1 (which may be a value of 0–100 on the basis of percentage). Thus, the search character string input module 210 displays a slider or scroll bar having a handle which indicates any position between 0 and 1. The handle of slider may indicate, for example, 1 as the default, and may be operated to indicate another value by dragging and moving the handle with the mouse 112.

A result display module 212 accesses the database 202 based on the document number as the result of search given by the search engine 208 and the value of position at which the search character appears in the document, and displays a line corresponding to that position in the document. The line is preferably output in a separate display window. If the search result cannot be contained in one screen of the window, a scroll bar appears so that the user can sequentially view the search results by clicking the scroll bar. In the preferred embodiment of the present invention, the result display module 212 has a capability to display the extracted unique character string once on the display 110. The user may add, delete or modify the unique character string, change weighting on each unique character string, or set a condition such as AND or OR on the unique character string, and then may perform search by using the unique character string after such modification.

C. Operation

Figure 10:
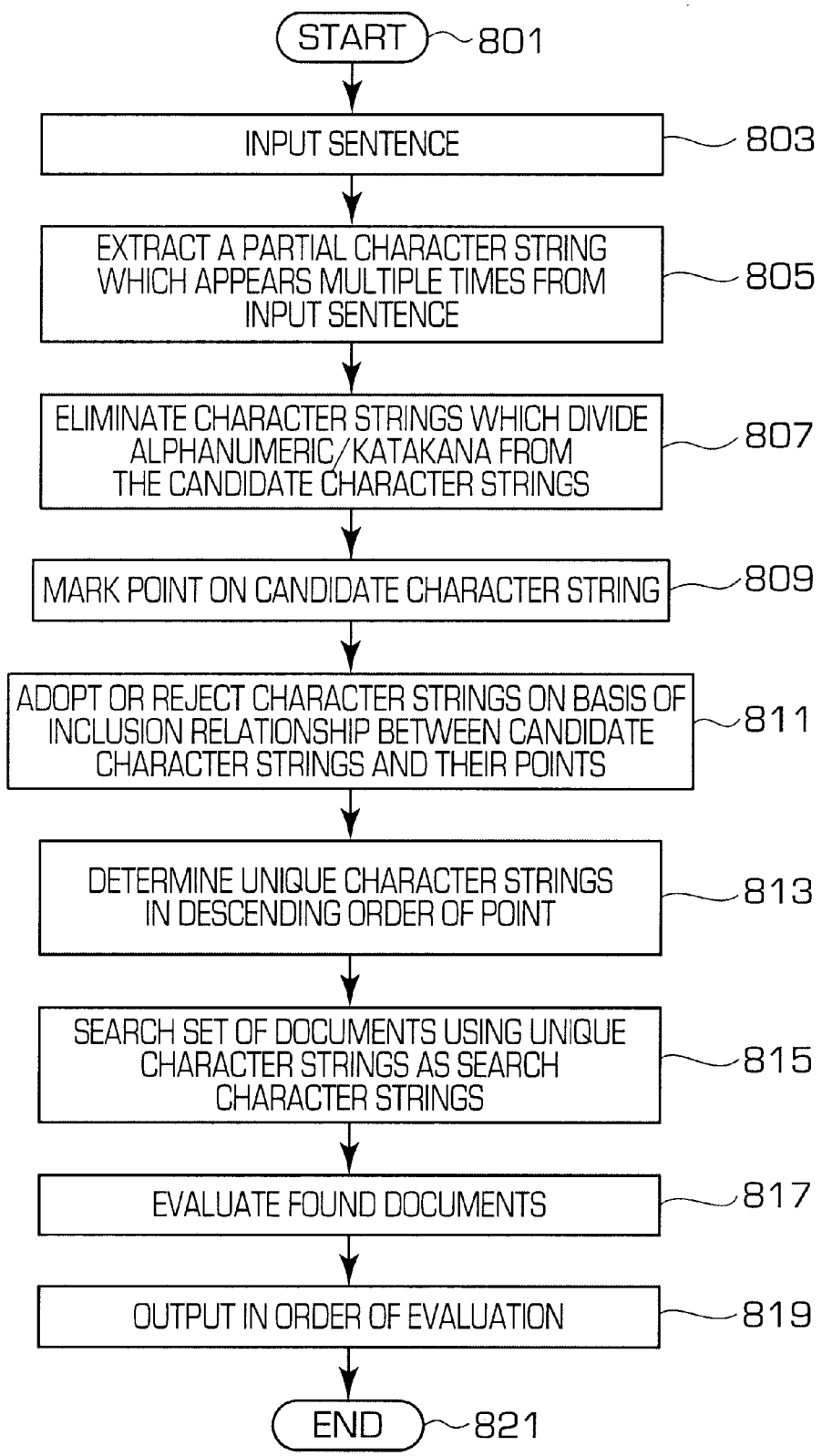
FIG. 10 is a flowchart showing extraction of a unique character string from an input document.

FIG. 10 shows the steps of the search method in the preferred embodiment of the present invention. First, the process starts with step 801. Then, a sentence is input (step 803). Then, a candidate character string is determined by extracting a partial character string which appears multiple times from this input sentence (step 805). Then, character strings which divide alphanumeric/katakana are eliminated from the candidate character strings (step 807). Subsequently, points (an amount of feature) are marked on the remaining candidate character strings to indicate how much each of the candidate character string constitutes the feature of the input document (step 809). Then, the character strings are adopted or rejected as unique character strings based their relationship to the candidate character strings and their point values (step 811). In addition, the unique character strings are determined, for example, in the descending order of point assignments (step 813). Then, the entire set of documents is searched by using the determined unique character strings as the search character strings (step 815). Then, the documents found by the search are evaluated (step 817), and the titles of documents or the like are output in the order of evaluation (step 819).

Prior to the detailed description of each process step in the preferred embodiment of the present invention, examples of operations available to the user will be described with reference to FIGS. 11 through 15. This example illustrates a search of a database containing a plurality of news articles. Here, the example uses a database of news articles of Nihon Keizai Shimbun for one year for which IBM ("IBM" is a trademark of IBM Corporation, U.S.A.) is granted a license for use of copyright from Nihon Keizai Shimbun-sha ("Nihon Keizai Shimbun" is a trademark of Nihon Keizai Shimbun-sha).

Figure 11:
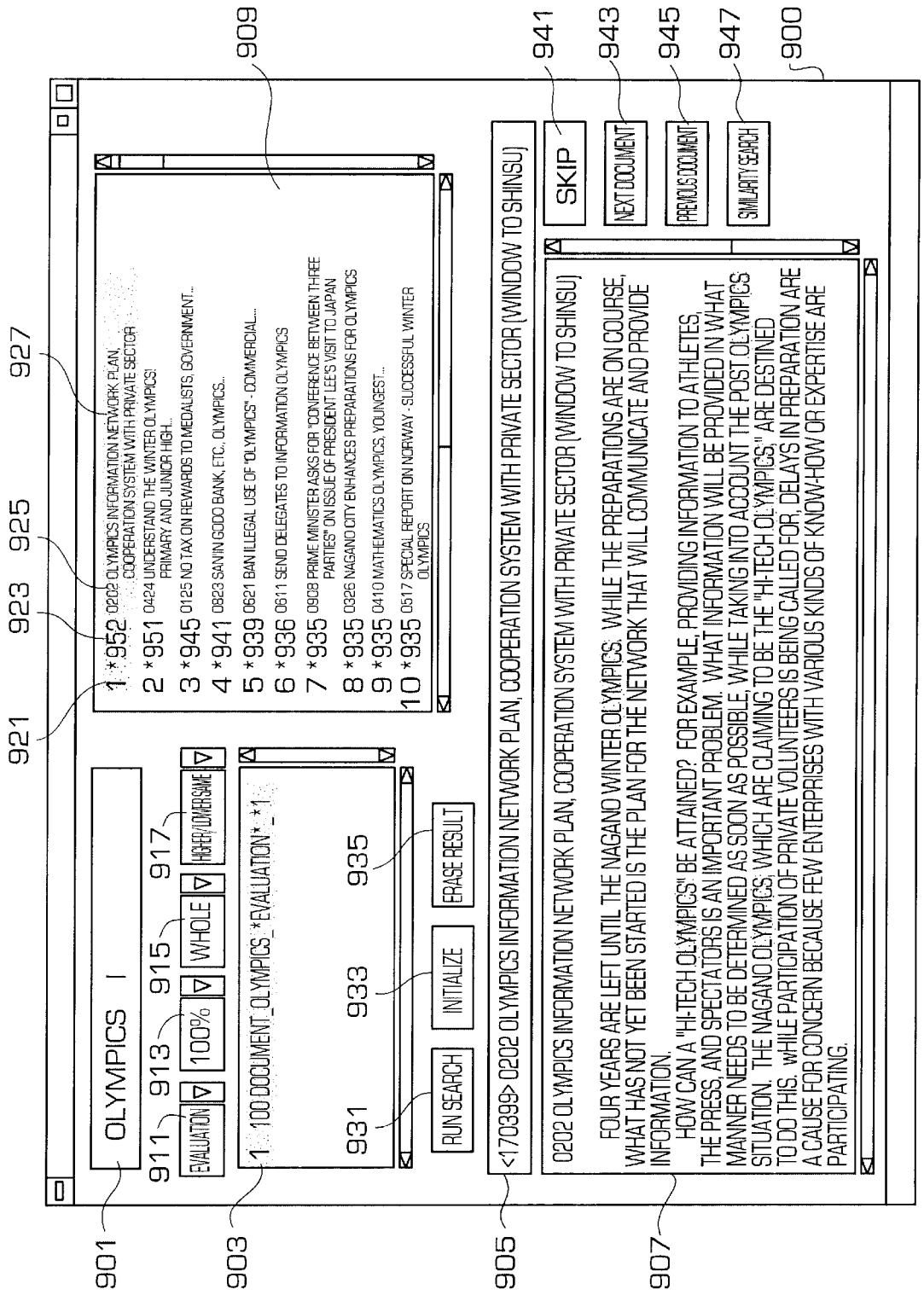
FIGS. 11–15 are diagrams showing user interfaces in a preferred embodiment of the present invention.
Figure 12:
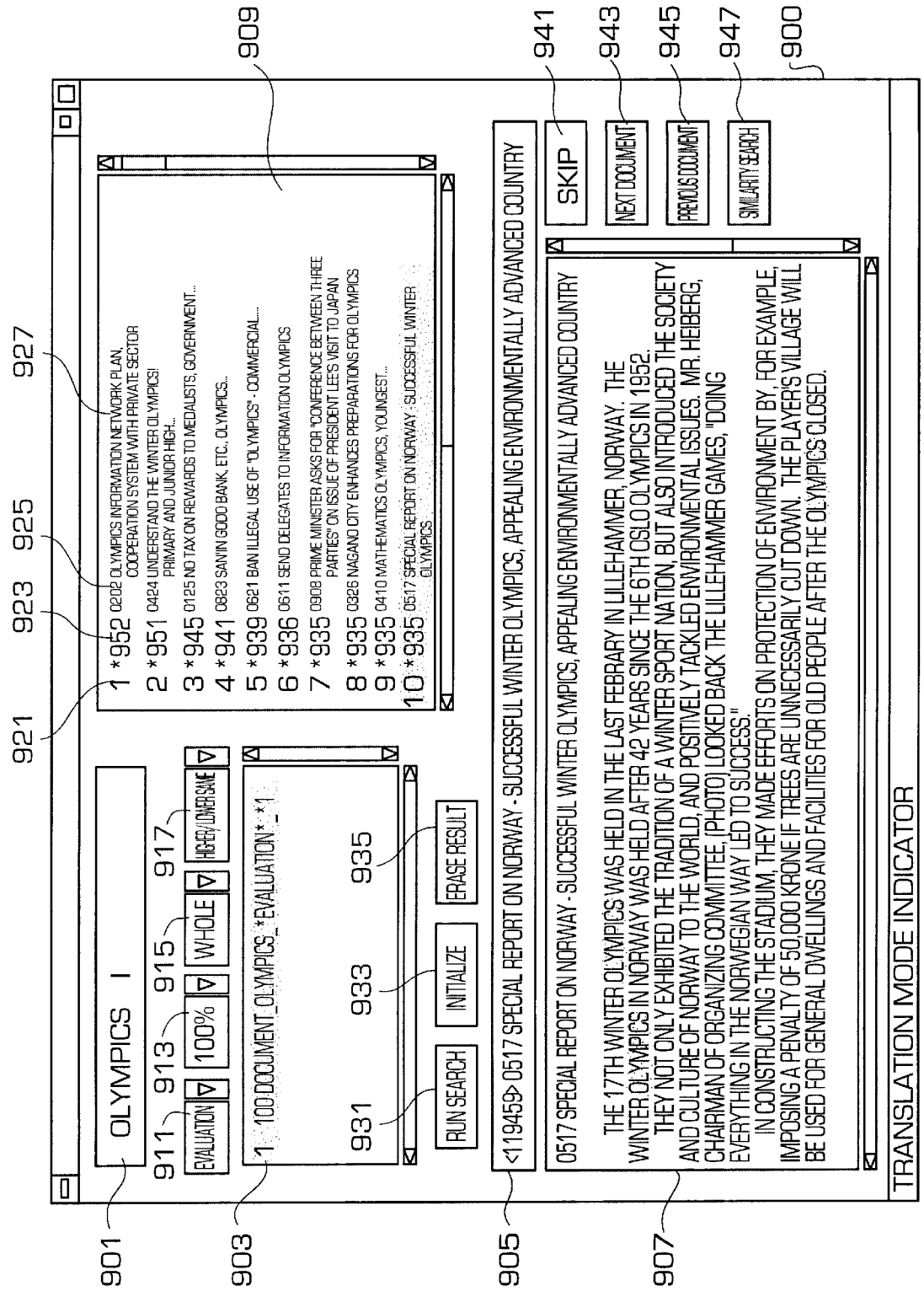
Figure 13:
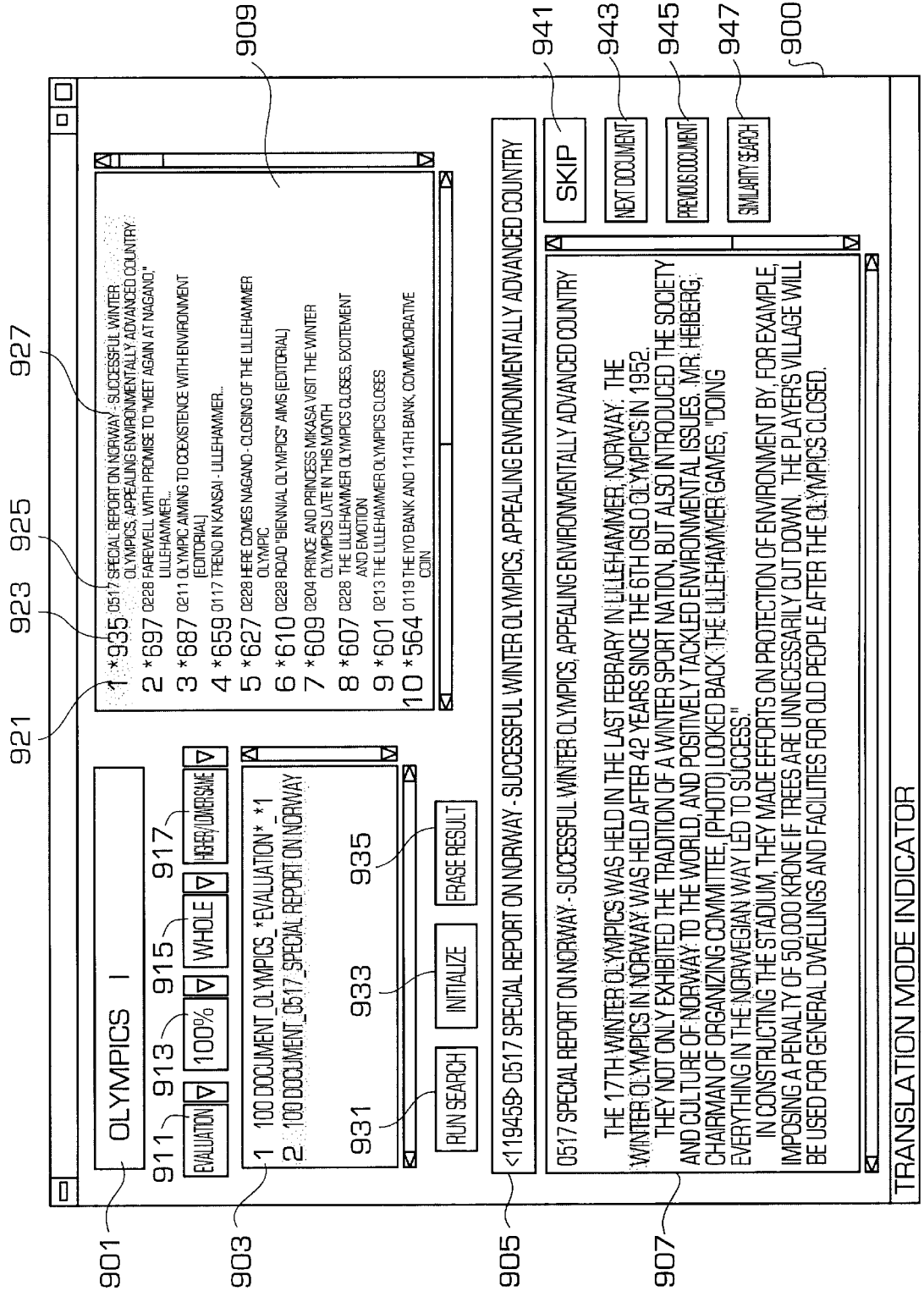
Figure 14:
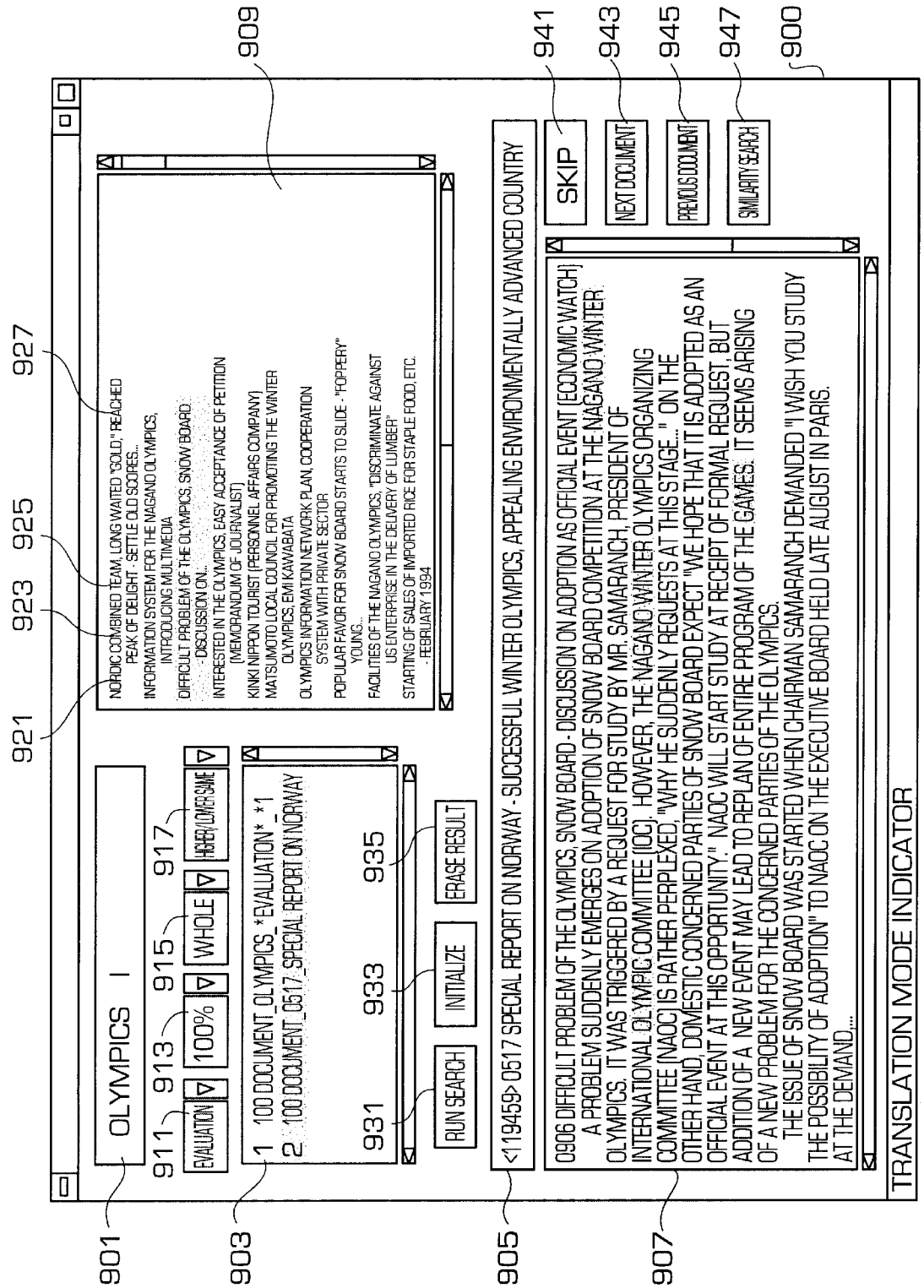

(1) The user inputs "Olympics" in an entry area 901 shown in FIG. 11 via the keyboard 106, and presses the Enter key, or clicks the button for Execute Search 931.

(2) The system detects the user input, and searches articles containing a character string "Olympics" by a conventional search process or the ambiguity search process to be described later.

(3) Then, the system outputs the result of search on the screen. Specifically, a list of titles 927 on various articles relating to Olympics such as Mathematics Olympics, a store called Olympic, or Nagano Olympics is output a window 909 in the order of matching factor together with serial numbers 921, matching factor 923 and the date of articles 925. In this embodiment, a document with a high matching factor 100 is selected, and data identifying that document is stored. In addition, the content of a document with the highest matching factor is caused to be displayed in a window 907, and its title or the like is displayed in a window 905. Also, the title or the like of the document currently displayed in the window 907 is highlighted and displayed in a window 909.

(4) The user causes the content of the document in the window 907 to change by clicking the title in the list of titles in the window 909 or the like. Then, after reading several articles, the user selects an article "Olympics Edition—Successful Olympic Winter Games, Appealing Environment Conscious Nation" from the window 909, and clicks the button. While the user wishes to read articles on Olympic Winter Games held several years ago, he or she is informed that the keyword for articles he or she wishes to read is "Lille Hammer" after viewing this article.

(5) The user clicks Search Similar button 947 to read articles resembling this article (it may be possible to perform the search again for the set of documents extracted in the search for Olympics by entering "Lille Hammer" in the entry 100).

(6) The system detects this input, and performs the search with the method according to the present invention using "Olympics Edition—Successful Olympic Winter Games, Appealing Environment Conscious Nation" as the input. Specifically, a unique character string is extracted from that article, and the similarity search is performed by using that unique character string.

(7) The system displays the result of the search on the screen. Specifically, the list of titles is sequentially output in the window 909 in descending order from the highest matching factor. While, in the embodiment, the content of the document with the highest matching factor is displayed in the window 907, and its document number, title or the like are displayed in the window 905, it may be possible to display the content of a document with the next highest matching factor in the window 907. The input title is displayed first because the document with the highest matching factor corresponds to the input document used for the search. In the window 907, a character string matching or similar to the unique character string in the content of the searched document is highlighted. Displayed in the window 903 is a title of the search for accessing the result of search. Here, information such as the serial number, the number of documents, and the searched titles is displayed. When the title of "Olympics" previously searched is clicked, information similar to that in FIG. 11 is displayed again in the windows 907 and 909.

(8) After the user reads several articles output as the result of search by scrolling the window 909, then he or she may wish to read articles on snow-boarding. The user thus selects the article of "Issue on Olympics: Snow-board—Discussion on Adoption as Formal Event . . ." in the window 909, and clicks the button.

(9) The user clicks Search Similar button 947 to read articles similar to that article on snow boarding.

(10) The system detects this input, and performs again the search with the method according to the present invention using "Issue on Olympics: Snow-board—Discussion on Adoption as Formal Event . . ." as the input.

Figure 15:
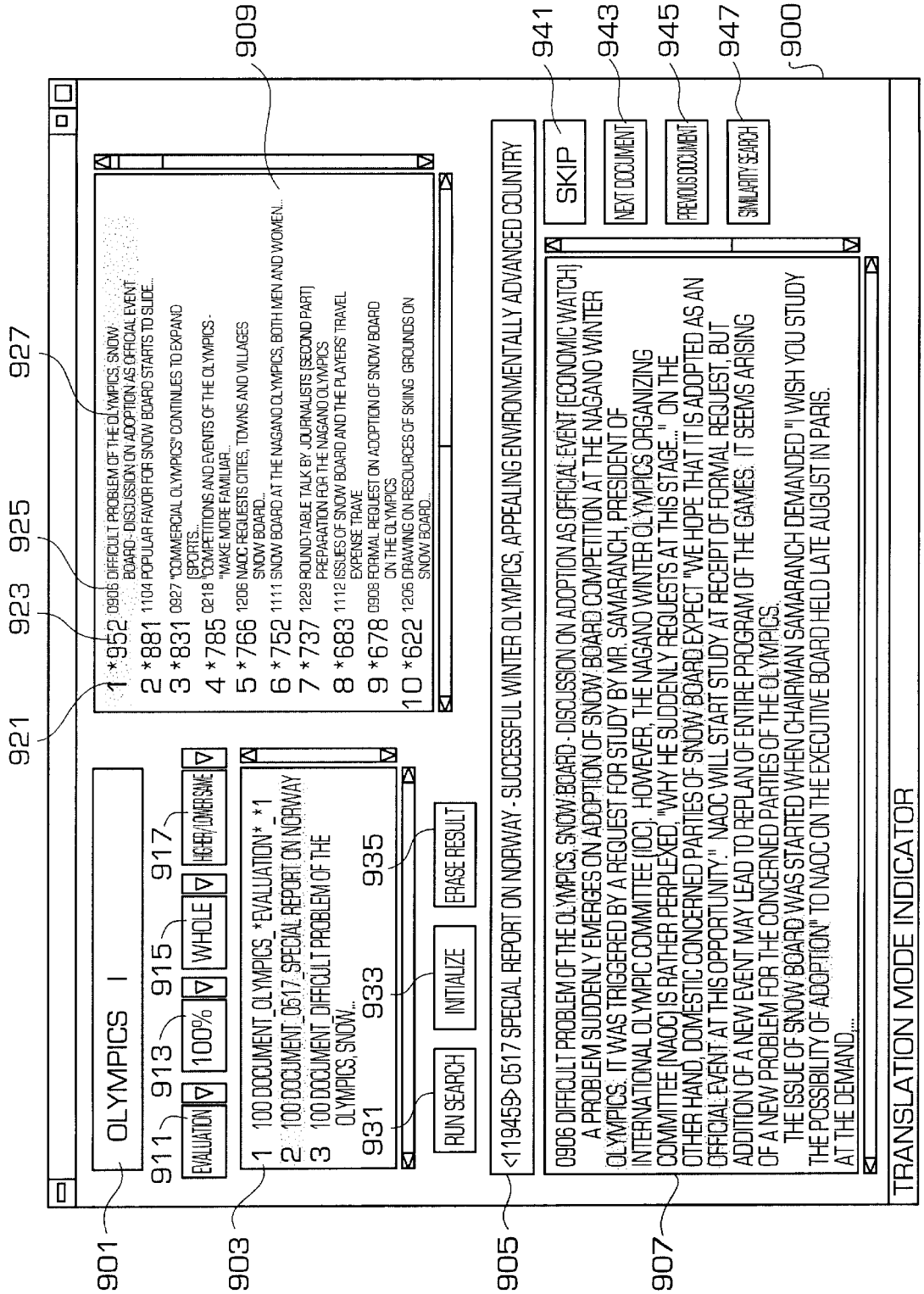

(11) The system outputs the result of search as shown in FIG. 15 on the screen.

The user interface in the preferred embodiment of the present invention has various additional functions. For example, a pull-down menu 911 is one for inputting a search condition such as AND or OR, or selecting the number of documents set to be extracted as the set of search results, or an allowable similarity factor. A pull-down menu 913 is one for selecting a matching factor of a character string in performing the ambiguity search. In addition, a pull-down menu 915 is one for selecting whether the subject of search is an entire document or a set of partial documents such as a set of searched documents. When the search is performed again for the set of searched documents, unique character strings are extracted by comparing the input document and a set of documents as the result of search limited to a category. Thus, it is possible to extract a character string which is a feature of the input document from a plurality of documents containing similar contents. In addition, the pull-down menu 915 enables selective searching for a limited part of a document such as searching for only titles, instead of the entire document. In this case, such a search can be attained by creating an index file only with titles, by embedding characters or symbols in the document for distinguishing the title and the body and detecting the embedded characters to exclude the body from the subject of the search, or by causing the title to exist at a fixed area in the document and performing the search only for that area. A pull-down menu 917 is a one for selecting whether search is performed by differentiating between the upper and lower case of alphabet.

A button 933 initializes the pull-down menus 911 to 917. For example, when the user has changed the pull-down menu 913 to 80%, and the pull-down menu 915 to the document set 1 (the set of documents as the result of search by the character string "Olympics"), the pull-down menus 913 and 915 are returned to the initial state of 100% and the entire document, respectively, by clicking the initialization button 933. A button 935 is a delete search result button. While the system stores information for identifying a document set as the result of search, clicking of this button causes the system to release the information on the document set inversely displayed in the window 903 at present, and to delete the titles of the document set from the window 903.

A button 941 scrolls through the document so as to display a next unique character string (or matched character string, or similar character string) in the document. A button 943 is used to display a document with the next higher similarity factor, while a button 945 is to display a document with the next lower similarity factor.

In the sequence of steps, (1) through (4) are performed by a known search approach, or an approach for ambiguity search described later. Steps (5) through (11) in accordance with the present invention are described in the following section.

D. Extraction of Unique Character String

In the search method of the present invention, a unique character string is first extracted from an input document. The unique character string is extracted in accordance with two strategies: (1) extracting a character string with an appearance frequency in the input sentence that is relatively higher than that in the entire set of documents; (2) extracting a character string which is meaningful even if it is solely extracted.

For Strategy 1, the above-mentioned index file is used. The index file holds all N-character strings in the entire set of documents, and position information data of their appearance in a unique format. The quantity of position information data changes in a substantially proportional way with respect to the appearance frequency of corresponding N-character strings in the entire set of documents. The index file can be searched at a high speed in view of the unique structure of its index. During the search, the size of position information data is utilized as a value indicating the appearance frequency of N-character string in the entire set of documents.

Detailed steps for extracting the unique character string are described below.

D1. Creation of Candidate Set for Unique Character String

A candidate set for the unique character string is formed in accordance with the following rules.

Extraction Rule 1 Partial character strings of N characters or more appearing in the input document two or more times are extracted, and added to a candidate set of the unique character string. Symbol characters such as ".", ",", and "(" are excluded during the extraction. N is the number of characters in the character chains held in the index file. In a delimiter language such as English, a word may be extracted as a partial character string. In the extraction, it is permissible that a plurality of words are converted to one conceptual word when the words have a common meaning. An example of words that may be converted include "display-""display device", "CRT" or the like to "display device", and then the partial character strings are extracted. In addition, if desired, it may be possible to perform normalization such as conversion from upper case to lower case, conversion from double byte characters to single byte characters, conversion from the plural to the singular, or conversion of tense from the past or past perfect to the present. In addition, it is possible to perform effective extraction of the unique character string at a high speed by excluding character strings such as "a", "the", or "is" which generally do not constitute a feature of the document.

Exception Rule 2 When the partial character string extracted by the extraction rule 1 divides continuation of an alphanumeric into K characters or less at its start or end position, the partial character string is excluded from the candidate set for the unique character string. For example, if K is 4, it is possible to prevent "vision" from being extracted from "television".

The purpose of this step is to extract character strings which compose a significant character set based on the relationship among its characters. In other words, a character string is preserved if it is meaningful even if it is solely extracted as defined by Strategy 2. The exception rule 2 is based on experimental knowledge that when an alphanumeric string is too finely divided, it becomes meaningless. In addition, with the above rules it becomes possible to take into account different forms of English words.

D2. Assigning Points to Determine a Unique Character String Candidate

A higher point is accorded to a candidate unique character string (hereinafter "a candidate character string") with a relatively lower appearance frequency in the entire set of documents and higher appearance frequency in the input sentence. Thus, the simplest calculation formula is:

EQUATION 1

Amount of feature=Appearance frequency of candidate character string in input sentence/Appearance frequency of candidate character string in entire set of documents In addition, when the number of characters in the input sentence and the entire set of documents is taken into account, it can be replaced by the following calculation formula.

EQUATION 2

Amount of feature=(Appearance frequency of candidate character string in input sentence*number of characters in entire set of documents)/(Appearance frequency of candidate character string in entire set of documents*number of characters in input sentence)

Figure 3:
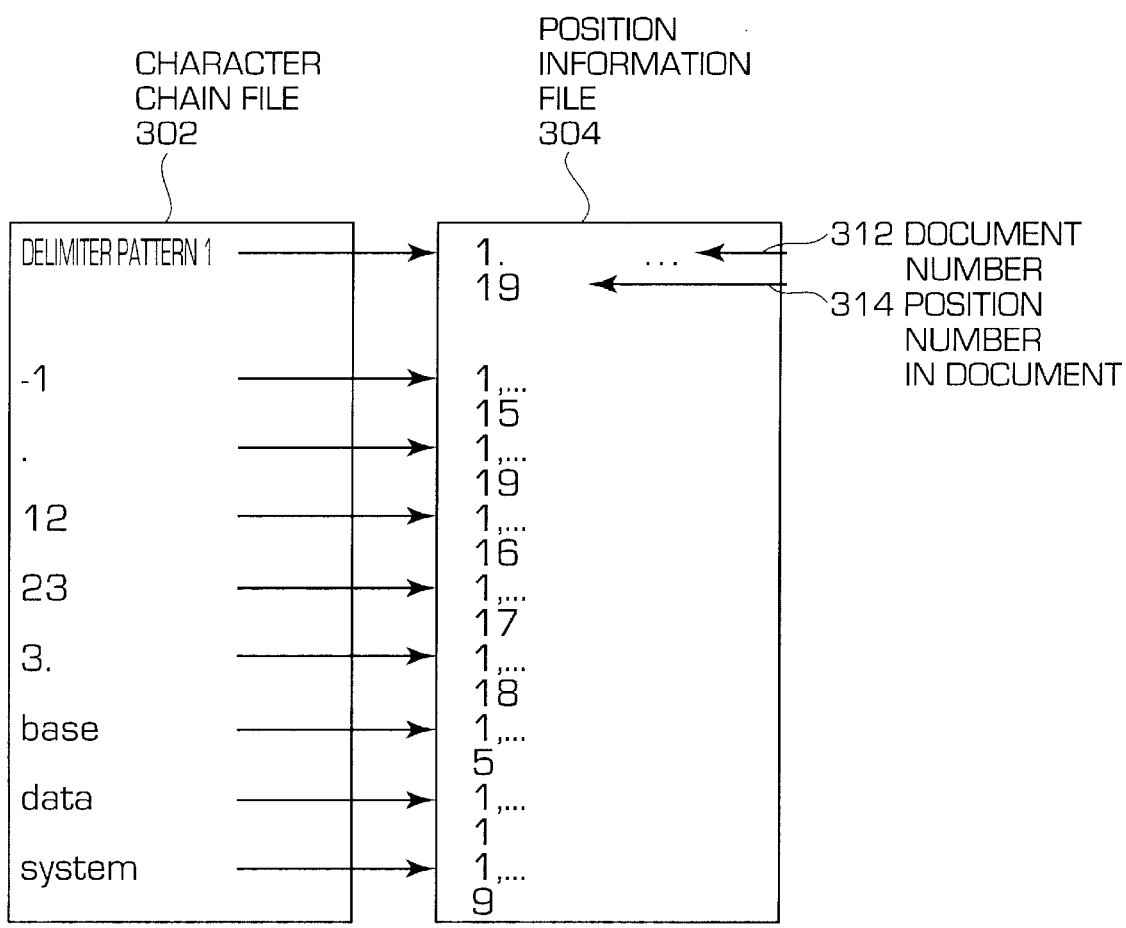
FIG. 3 is a diagram showing the character chain file and position information file structure of an index file for searching documents.

Since the position information file shown in FIG. 3 is used in the preferred embodiment of the present invention, points can be assigned according to Equation (1) in such a manner that (1) a higher point is given to a candidate character string containing an N-character chain with less appearance frequency in the entire set of documents, but higher appearance frequency in the input sentence, and (2) a higher point is given to a candidate character string with a higher appearance frequency in the input sentence. Point assignment is performed according to Equation 3, with the variables described below.

count i: Appearance frequency of i-th candidate character string in input sentence Ncount i j: Appearance frequency of j-th N-character chain of i-th candidate character string in input sentence (In the case of a delimiter language such as English, appearance frequency of a word in an input sentence.)

Nsize i j: Value (number of bytes) of position information data corresponding to j-th N-character chain of i-th candidate character string (the number of position numbers in document of the position information file shown in FIG. 3 can be utilized as the appearance frequency information of N-character chain in the entire set of documents) quantized to Q levels (Q being a constant) (in the case of a delimiter language such as English, the position information of that word is used)

Nnum i: Number of N-character chains contained in i-th candidate character string.

EQUATION 3

Point of i-th candidate character string (amount of feature 1)=

$$\sum_{J=1}^{Nnumi} (\text{Ncount } ij / \text{Nsize } ij) / \text{Nnum } i \times$$
$$\text{count } i \times \max_{i,J=1}(\text{Nsize } ij) \bigg/ \max_{i,J}(\text{Ncount } ij)$$

This point assignment strategy corresponds to Strategy 1. As described above, the position information data is substituted for the appearance frequency of an N-character chain in the entire set of documents, and the quantization is to adjust for the difference of granularity between the units for Ncount and Nsize. The purpose of multiplication by Max (Nsize i j) and division by Max (Ncount i) is to adjust for the difference between the total amount of input sentence and the set of documents. For example, a lower point would be given to common character strings such as "the", "a", and "an".

The method for assigning points on the candidate character string may be modified by those skilled in the art. For example, the number of appearances may be effected such that 1.5 is added to each appearance of a character string at a position in a document with higher importance such as a heading or title in the input document, while a smaller value of 0.5 is added to the number appearances at a position in a document with less importance such as a footnote or a quotation.

Application of this equation is described on the following sample of English document. While an English example is set forth here, the equation may also be applied in searching Japanese language documents. An example of the application of the equation to a Japanese language text is set forth in JPA 8-095691.

The following example is based on one document in a database of news articles of Yomiuri Shimbun for which IBM is granted a license for use of copyright from Yomiuri Shimbun-sha ("Yomiuri Shimbun" is a trademark of Yomiuri Shimbun-sha). The values of MAX (NCount ij); MAX (NSIZE ij); NSIZE 1,1; and NSIZE 2,1 are based on the database contents.

Sample of English document

Ranking Search and Fuzzy Operation

Ranking Search returns a list of documents in the order of the score which is level of relevance to specified search condition. The maximum number of the returned documents is specified by the user program. The Ranking Search allows the user to start looking into documents with the most desirable one, which realizes efficient and effective search task. The following three factors are selectable among the factors to decide the score of documents:

a. Frequency of search terms in the document As the search term appears more frequently in the document, the score of the document gets higher.

b. Frequency of search terms in the whole set of documents As the search term appears less frequently in the whole set of documents (all the documents indexed), the search term contributes to the score of the document more.

c. Weight parameter specified explicitly by the user program As the weight of the search term is larger, the search term contributes to the score of the document more.

The user program can specify which factors to use: one of them, two of them, or all of them. It is allowed to use none of them, and in that case the score is decided by whether the document contains the search term or not. Usually, specifying a and b is recommended.

The way to choose the documents to be scored is selectable from the following two:

Strict Boolean operation

Scoring is done for the set of documents as a result of the traditional Boolean operation.

Fuzzy operation

Scoring is done for all the documents containing at least one search term. In this case, the operator is said to be a Fuzzy operator such as "Fuzzy AND".

Fuzzy Operation

By Fuzzy AND operation, for example, the result of "A AND B AND C" is evaluated higher in the following order:

The document containing all of the three

The document containing two of the three

The document containing one of the three

By Fuzzy NOT operation, for example, the result of "A NOT B" is evaluated higher in the following order:

The document containing "A" and not containing "B"

The document containing both "A" and "B"

The traditional strict Boolean operation has an advantage in the speed, but it does not allow to evaluate the intermediate status.

By using Fuzzy operation, the intermediate status, such as "The document contains not all search terms but almost all" is evaluated, therefore the result is natural to the way of human thinking. Fuzzy operation can be used in Ranking Search only.

In the above example, the extracted character strings are "fuzzy", "search", "document", "operation", "score", "term", "contain", "rank", and "evaluate".

Here, if the first candidate character string is "fuzzy", and the second candidate character string is "and", the point allocation for each of these candidate strings can be determined according to equation 3 as follows.

Calculation of points for "fuzzy" is based on"

$$\underset{i,j}{\text{Max}} (\text{Nsize } i, j) = 390612$$
$$\text{Nsize } 1, 1 = 3028$$
$$\text{Nsize } 2, 1 = 169568,$$
then
$$\text{Ncount } 1, 1 = 9$$
$$\text{Nnum } 1 = 1$$
$$\text{count } 1 = 9$$
$$\underset{i,j}{\text{Max}} (\text{Ncount } i, j) = 59.$$

Thus, the point of a candidate string "fuzzy" is: score 1=9/3028/1×9×390612/59=177.10.

Calculation of points for "and" is based on Max ($N_{count\ ij}$); Max (Nsize ij); N size 2,1 as set forth above, and Ncount 2, 1=10
Nnum 2=1
count 2=10, Thus the point of a candidate string "and" is score 2=10/169568/1×10×390612/59=3.90.

Here, if a threshold value for selecting a string as a unique string is 150 points, then "fuzzy" is a unique string and "and" is not.

D3. Adoption or Rejection of Candidate Character String Based on Degree of Overlapping Candidate character strings satisfying either of the following conditions may excluded from the set of candidates.

Condition 1 A character at the second character or later is the first character of another candidate character string with higher point allocation.

Condition 2 A character at the second to the last character or former is the last character of another candidate character string with higher point allocation.

If the candidate character string to be excluded contains a character string of a length of N or longer not overlapping any other candidate character strings, it is marked with points according to the calculation step and is added to the set of candidates for the unique character string. The purpose of the above conditions is to eliminate a candidate character string having a weak relationship to characters appearing before or after the string.

D4. Determination of Unique Character String From Candidate Character Strings

A character string having points of X and Y or more is determined to be a unique character string. X and Y are constants.

E. Search with Unique Character String

Documents containing the unique character string are searched from the entire set of documents. In the preferred embodiment of the present invention, documents containing a character string similar to the unique character string are searched from the entire set of documents with the ambiguity search. The details of the ambiguity search is described later. The search match factor for each unique character string (a search parameter indicating how much ambiguity is allowed) is suitably determined.

F. Output of Found Documents in the Order of Evaluation

The found documents are evaluated and arranged in the order of evaluation. The similarity factor of a document is evaluated in such a manner that the number of appearances of each unique character string in the input sentence is used as weight. Additionally, a higher evaluation is provided for a document in which unique character strings with a higher weight appear many times. The simplest calculation formula can be expressed where the above-mentioned number of appearances is used as is, and if the weight of the k-th search character string (unique character string) is weight k, the similarity factor of document score(d) of document d is

EQUATION 4

$$score(d) = \sum_k (\text{weight } k \times \text{appearance frequency of k-th search character string}).$$

In addition, such similarity factor may be converted by various function equations so that it is dispersed between 1 and 0. Similarly, the weight value may be also dispersed between 0 and 1.

In the preferred embodiment of the present invention, the similarity factor of a document is evaluated by taking the matching factor of the result of an ambiguity search into account, using the number of appearance of each unique character string in the input document, and using the equation below [Equation 5] so that a document in which many unique character strings with higher weight appear is provided with higher evaluation.

When the weight of the k-th search character string (unique character string) is represented as weight k, and the matching factor of the first hit (character string similar to the search character string) in a document of the number d as percent (d, k, 1).

EQUATION 5

$$score1(d) = \sum_k \left( \text{weight } k \times \underset{1}{\text{Max}}(\text{percent}(d, k, 1)) \right)$$

$$score2(d) = \sum_k \left( \text{weight } k \times \sum_1 \text{percent}(d, k, 1) \right)$$

$$score(d) = \underset{x}{\text{Max}}(score2(x)) \times score1(d) + score2(d)$$

The above [Equation 5] can be substituted to the following equation [Equation 6], where g (d) is a suitable function including the length of document d, and increasing with the length of document d according to the proportion:

Length/(length+C): C being a constant as the length increases.

In addition, T, W, and S are suitable constants larger than 0 but less than 1.

EQUATION 6

$$f(d, k) = \sum_1 \text{percent}(d, k, 1)$$

$$t(d, k) = T + (1 - T) * f(d, k) / (f(d, k) + g(d))$$

$$w(d, k) = \text{weight } k / \sum \text{weight } k \times (W + (1 - W) * t(d, k))$$

$$score(d) = S \times \underset{k}{\text{Min}}(w(d, k)) + (1 - S) \times \sum_k w(d, k) / n(d)$$

where:

"f (d, k)" indicates appearance frequency for which the result of similarity search is taken into account.

"t (d, k)" is to normalize the "f (d, k)" to 0–1 considering of the length of the document; and "w (d, k)" is added with a weight value.

G. Structure of the Index File and How to Create It

In the present invention, files which index a series of characters belonging to a character set C (variable length chains), all continuous N characters not belonging to the character set C (fixed length chains), their positions in the document, and division information in the document are created. FIG. 3 illustrates a document chain file 302, and a position information file 304. Here, the "character set C" means a predetermined set of characters, preferably in alphabetic form (i.e., 'A'–'Z', and 'a'–'z'). However, it is contemplated that the set C may include characters used in languages such as German, French, Italian, or Russian, may be alphanumeric, and be of single or double byte characters, and may include several symbol characters such as "?", "!" or "'". Moreover, the "division information in document" means typically a delimiter in a sentence such as "." or ",", and a delimiter in document in a broader sense such as "Chapter 1", "Summary", a blank line, or a blank character (s).

Figure 4:
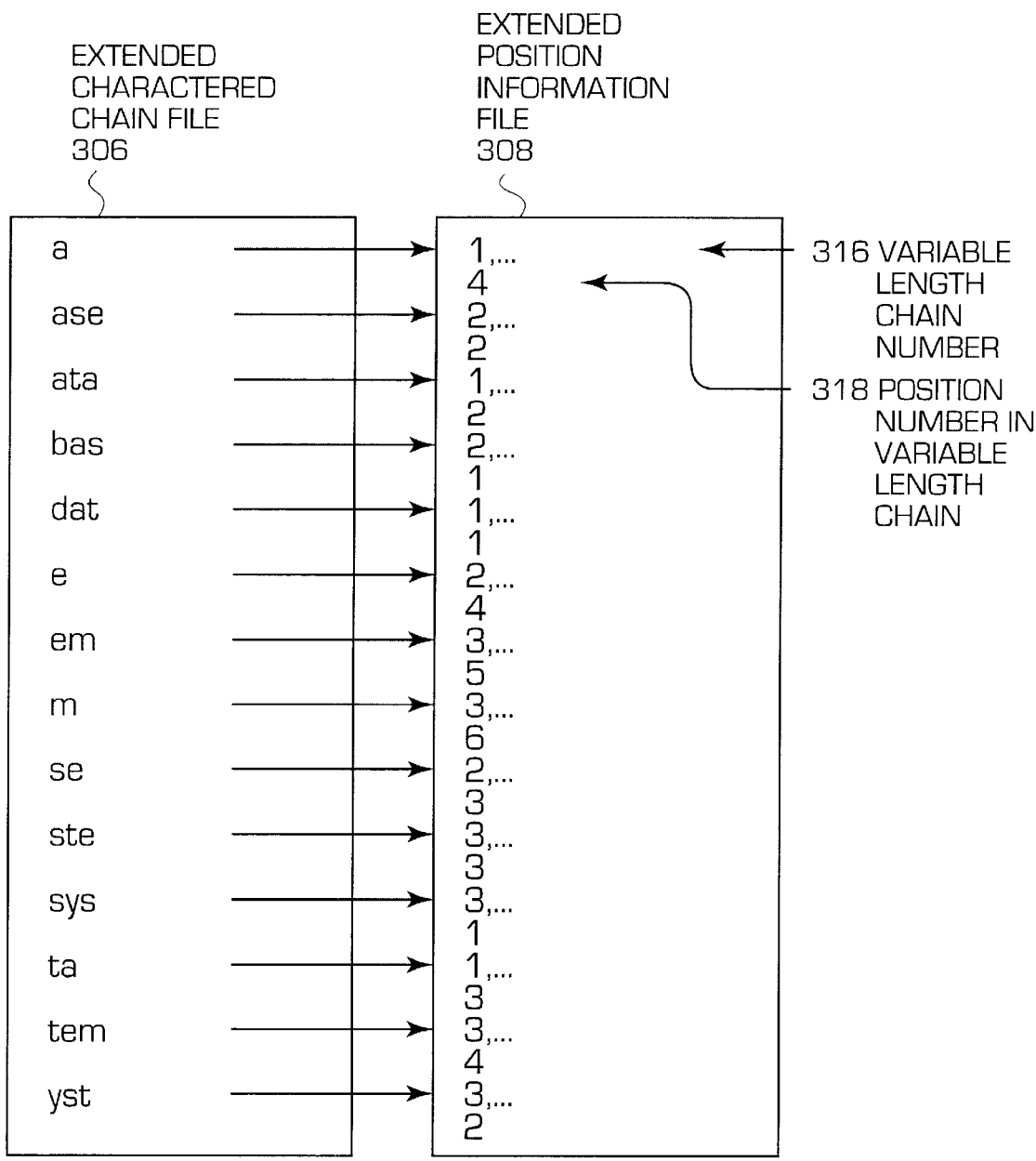
FIG. 4 is a diagram showing an extended character chain file and extended position the structure of an index file for searching documents.

Files are created in response to the variable length chains, which index all of continuous N" characters in all variable length chains (extended fixed length chains) and their positions in the variable length chains with the variable length chains. FIG. 4 illustrates an extended character chain file 306 and an extended position information file 308.

The four files: the document chain file 302, the position information file 304, the extended character chain file 306, and the extended position information file 308 are not necessarily physically different files. It is sufficient that the information be stored in such a manner that the content controlled by each file can be logically processed.

G1. Normalization of Character String

In a preferred embodiment of the present invention, character strings are normalized prior to creating the index file. For example, when the document to be searched is a Japanese document file, single-byte and double-byte characters may be intermixed. Normalization processing is performed to replace single-byte characters with corresponding double-byte characters (or vice versa), and lowercases with uppercases (or vice versa). The normalization of character strings is not essential component of the present invention.

The details of normalization may be changed to normalize the string according to a user's specifications. It may be desired to perform normalization conversion between the plural and the singular, and conversion of tense from the past or past perfect tense to the present tense, etc.

G2. Extraction of Fixed Length Chain Information

The next step for creating the index file is to extract, for all characters to be searched in the normalized character string and not belonging to the character set C, continuous N characters starting from these characters (hereinafter called "fixed length chains"), and to store them in the index file together with the document number and the position number in the document. For values of N, N≧1 (specifically, N=2) is suitable for Japanese, Chinese and Korean.

It is desirable not to search series of a character belonging to the character set C and an adjacent blank character in order to reduce the size of the index file.

G3. Extraction of Variable Length Chain Information

The next step to create the index file is to extract continuations of characters in the normalized character string and belonging to the character set C (variable length chains), and to store them together with the document number and the position number in document in the index file. As set forth above, the character set C need not be alphabetic. In this case, the character string may contain a plurality of variable length chains in which character strings are continuous. While the character string may include a plurality of variable length chains, a variable length chain can still be extracted by using a blank, line feed, ",", ".", "!", or "?" as a delimiter.

For example, in the case of "Boys be ambitious." or "Boys (line feed) be ambitious.", three variable length chains of "Boys", "be", and "ambitious" can be extracted. Additionally, in the case of "line feed" following "-" and not including any blank before or after it, continuations of characters before or after the "_" may be determined to comprise a single variable length chain. Accordingly, even in the case such as "Boys be ambi-(line feed)tious", three variable length chains of "Boys", "be", and "ambitious" are extracted.

G4. Position Information

In the preferred embodiment of the present invention, every individual document is divided into blocks in a manner such that they are meaningful for search. Division information is stored in the index file. The document may be divided into blocks by detecting line feed, a period, punctuation, "Chapter X", or "Section X", detecting a blank line, or detecting the paragraph number in a patent specification, or a certain number of characters may be incorporated as one block. These blocks are assigned a series of numbers or block numbers. A specially defined delimiter pattern is stored together with the document number of the document and the position information in the document for characters at the boundaries of blocks.

Several different division methods can be obtained by defining several types of delimiter patterns. However, the delimiter pattern should be defined not to overlap character chains being extracted from a normalized character string. Since one-byte codes may be converted into two-byte codes through the normalization, if two bytes are assumed to be one word, when the value of the word is 255 or less, it is not applicable to a normal character code. Then, any word value between 0 and 255 can be individually assigned to several types of delimiter patterns.

The advantages to storing the division information in a format similar to that of the character chain are as follows:

Easy to create and update the index. No particular processing is required for the division information; and The capacity of the index is not significantly increased.

Increase in capacity is significantly small when compared with a format which appends corresponding block numbers to every position number in the document. The position number in a document is a unique sequential number in the document block and is assigned to all characters to be searched in the document. The position number in the document for the first character in a character chain is determined to be the position number in the document for that character chain. If a fixed length chain is less than N at the end of continuation of characters not belonging to the character set C together with subsequent characters, predefined padding characters such as X'00' are padded to make the number of characters N.

G5. Extraction of Extended Fixed Length Chain Information

The next step to create the index file is to extract, for all characters in all variable length chains, continuous N' characters starting from these characters (hereinafter called "extended fixed length chains"), and to store them in the index file together with the extended character chain number and the position number in the extended character chain. However, N'≧1 (specifically N'=3) is suitable if the character set C is alphabetic. The search speed can be improved when an extended fixed length chain is extracted after appending a start mark and an end mark before and after a variable length chain, respectively. For example, when "$" and "¥" are used as the start and end marks, respectively, extended fixed chains "$ca", "cat", "at¥", and "t¥" are extracted from a variable length chain "cat". Then, it becomes possible to eliminate mixing of "communication" or the like as noise in determining matching of "$ca" or the like.

G6. Example of Position Number in Document

For example, it is assumed that a document containing a sentence "data base system-123" at the beginning is contained in the database 202 (FIG. 2). If blank characters adjacent to the characters belonging to the character set C are not searched, and assuming that the above character set C is alphabetic, then when a position number in a document is appended to each character in this sentence, they become as follows.

TABLE 1

| | | |
|---|---|---|
| Position number in document for characters | 1234  5678 | 9 10 11 12 13 14 15 16 17 18 19 |
| Normalized character string Delimiter method 1 | data  base | s y s t e m - 1 2 3. |

Then, it is assumed that the document number for that document is 1, and that the number of characters N for the fixed length chain is 2. Then, individual fixed length chains (length 2), delimiter patterns and document numbers associated thereto, and position numbers in the document are as follows.

TABLE 2

| Fixed length chain | Document number | Position number in document |
|---|---|---|
| −1 | 1 | 15 |
| 12 | 1 | 16 |
| 23 | 1 | 17 |
| 3. | 1 | 18 |
| 3 | 1 | 19 |
| Delimiter pattern 1 | 1 | 19 |

Individual variable length chains, document numbers associated thereto, and position numbers in document are as follows.

TABLE 3

| Variable length chain | Document number | Position number in document |
|---|---|---|
| data | 1 | 1 |
| base | 1 | 5 |
| system | 1 | 9 |

Then, it is assumed that the numbers appended to the variable length chains are sequentially 1, 2, and 3, and that the number of characters N' of the extended fixed length chain is 3, individual extended fixed length chains (length 3), variable length chain number associated thereto, and position numbers in variable length chain are as follows.

| Extended fixed length chain | Variable length chain number | Position number in variable length chain |
|---|---|---|
| dat | 1 | 1 |
| ata | 1 | 2 |
| ta | 1 | 3 |
| a | 1 | 4 |
| bas | 2 | 1 |
| ase | 2 | 2 |
| se | 2 | 3 |
| e | 2 | 4 |
| sys | 3 | 1 |
| yst | 3 | 2 |
| ste | 3 | 3 |
| tem | 3 | 4 |
| em | 3 | 5 |
| m | 3 | 6 |

When it is permissible to append a plurality of variable length chain numbers and position numbers in a variable length chain to the extended fixed length chain, the whole capacity can be compressed, and high efficiency can be obtained particularly for a document with many overlapped words. In addition, since overlapped searches can be eliminated by putting such overlapped character strings together, a high speed search can be performed.

G7. Role of Division Information in Document

Now, usefulness of the division information (delimiter) in a document to be searched is described.

Search only for a specific block

When a document is composed of the title, the abstract, and the body, for example, it may be common to perform searches only for a specific portion such as the title and/or the abstract. Such a search can be attained by storing delimiter patterns and their position information for the end of the title and the end of the abstract.

Search for document with strong association between a plurality of character strings It may be a common demand to perform searches with an awareness of the strength of association between a plurality of character strings depending on the context. For example, it is believed that there is a higher possibility of stronger association between strings when the character strings are in the same paragraph rather than when they are merely in the same document, and that the association between strings is further stronger if they are in the same sentence. It becomes possible to search a document in which a plurality of character strings are in the same block by storing delimiter patterns and their position information for the end of paragraphs or sentences so that search with awareness of the strength of association can be performed.

G8. Structure of Index File

It is necessary to store the character chain, the delimiter pattern, its document number, and the position number of a document in a manner that they can be efficiently extracted during searching. Thus, in this embodiment, as shown in FIGS. 3 and 4, the index file is composed of four files of the character chain file 302 (a file mainly storing the fixed length chain, the variable length chain, and the delimiter pattern), the position information file 304 (a file mainly storing the document number, and the position number in the document), the extended character chain file 306 (a file mainly storing the extended fixed length chain), and the extended position information file 308 (a file mainly storing the variable length chain number, and the position number in variable length chain). The character chain file 302 is arranged to store information on where the fixed length chain, the variable length chain, the delimiter pattern, and the document number 312 and the position number in document 314 associated to them are positioned in the position information file 304. The position information file 304 is arranged to store the document number 312 and the position number in the document 314.

The extended character chain file 306 is arranged to store information on where the extended fixed length chain, and the variable length chain number 316 and the position number in variable length chain 318 associated to it are positioned in the extended position information file 308. The extended position information file 308 is arranged to store the variable length chain number 316 and the position number in the variable length chain 318.

While the embodiment is described for a document in which the delimiter language and the non-delimiter language are intermixed, those skilled in the art would easily understand that the present invention can be applied to a document only of the delimiter language or a document only of the non-delimiter language. In the case having only the non-delimiter language, since there is generally no need to take the variable length chain into account, the extended character chain file 306 and the extended position information file 308 are not required. However, variable length chains may exist even in a non-delimiter language document if the document consists of keywords extracted from the abstract as in a patent specification.

In FIG. 3, entries in the character chain file 302 are the fixed length chains, the variable length chains and the delimiter patterns in all documents in the database 202. The entries in the character chain file 302 are preferably sorted in ascending order in the order of code values of normalized character chains so as to enable dichotomized searching. "Delimiter pattern 1", "−1", "12" and the like are individual entries in the character chain file 302. Here, "delimiter pattern 1", for example, collectively indicates delimiters of a sentence or phrase such as ",", or "." and is assigned a special two-byte value.

The position information file 304 of FIG. 3 stores at least one document number 312 corresponding to individual entries in the character chain file 302, and at least one position number in document 314 associated to each of the individual document numbers.

To cause the entries in the character chain file 302 to correspond to those in the position information file 304, the individual entries in the character chain file 302 have offset information (not shown) from the beginning of the position information file 304 for corresponding entries in the position information file 304, and information on the size of the entries in the position information file 304. For example, the character chain file 302 seeks the position information file 304 from its beginning based on offset stored in character chain file 302 with respect to "delimiter pattern 1", and reads number of bytes specified in the size information from the sought position, whereby it is enabled to collectively read with respect to "delimiter pattern 1" position number values of 16, 19, . . . in the document number 1, position number values in the document relating to the document number 2, . . . , and position number values in the document relating to the document number n, if any. In addition, by storing information indicating the range where the fixed length chains, the variable length chains and the delimiter patterns are stored, it is possible to determine to which of the fixed length chain, the variable length chain or the delimiter pattern the information stored in the character chain file 302 belongs.

Generally, the position number values in the document relating to the document number i are stored, for example, in a form of (document number i: 4 bytes), (number of position number in document k: 4 bytes), (first position number in document: 4 bytes), . . . (k-th position number in document: 4 bytes). Although, in this example, it is arranged to take 4 bytes for storing the absolute position of the document as a field for storing the position number in document, it is desirable in practice to store the offset from one previous position number in the document so that the number of bytes is saved to 1–3 bytes. It is also desirable to reduce the file capacity by performing compression through coding. This may be applied to the fields for storing the document number and the position number in the document.

In FIGS. 3 and 4, entries in the extended character chain file 306 are the extended fixed length chains in all variable length chains in the character chain file 302. The entries in the extended character chain file 306 are preferably sorted in ascending order in the order of code values of normalized character chains so as to enable dichotomized searching. "dat", "ata" and the like are the individual entries of the extended character chain file 306.

The extended position information file 308 of FIG. 4 stores at least one variable length chain number corresponding to the individual entries in the extended character chain file 306, and at least one position number in the variable length chain associated to each of the individual variable length chain numbers.

G9. Process for Creating Index File

Now, referring to FIG. 5, the process for creating the index file will be described. This process is one which is performed by the index creation/update module 206 of FIG. 2 when initially building the database 202, or adding or deleting a document to or from the database 202.

Figure 5:
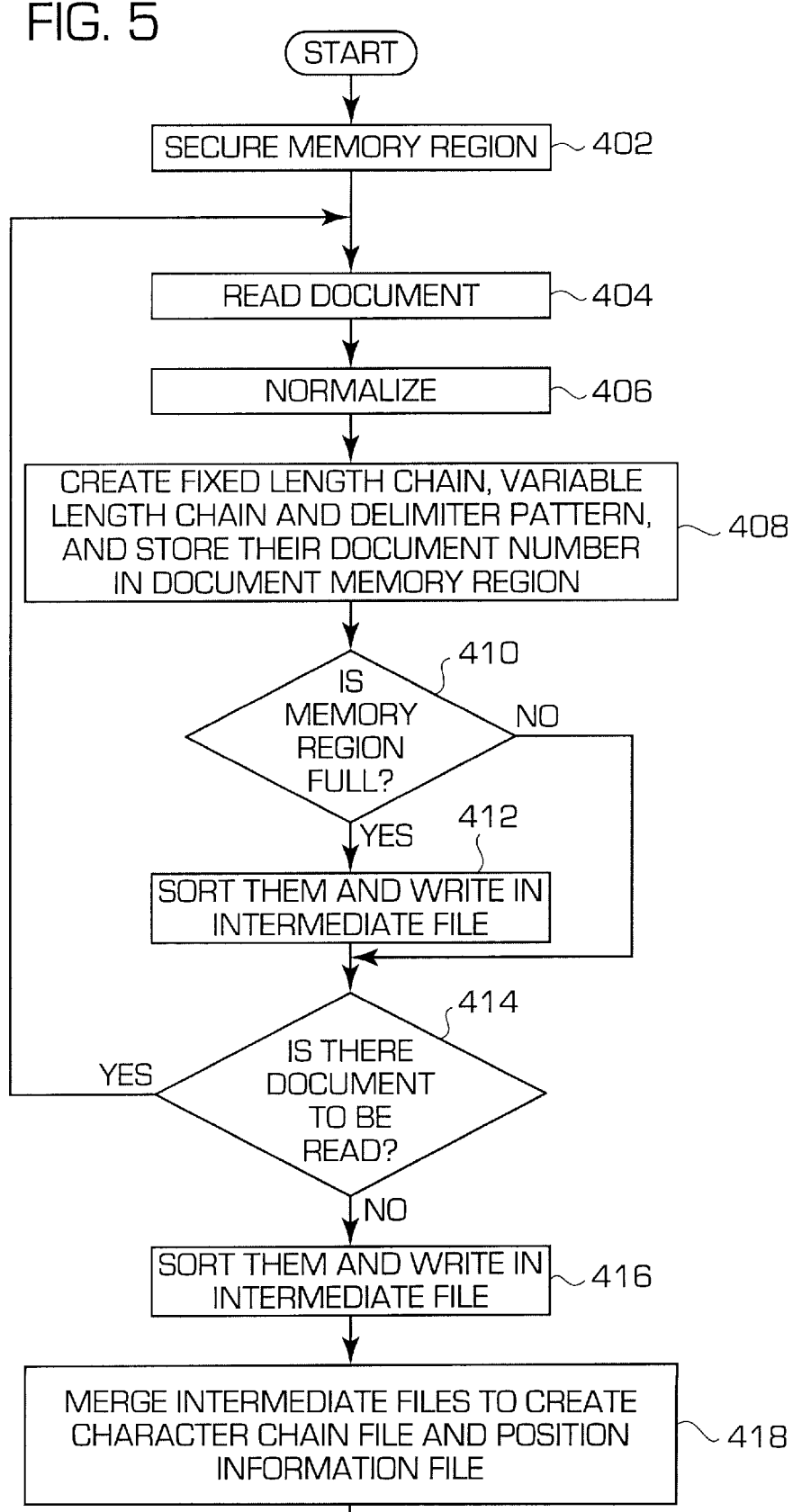
FIGS. 5–6 illustrate a flowchart showing an index file creation process.

In FIG. 5, step 402 performs to secure a memory region. This is a process to obtain a work area with a predetermined size on the RAM 104 by calling a function of the operating system.

In step 404, one document is read from the database 202 to the memory region obtained in step 402. In step 406, the above-mentioned normalization is performed for the document read in step 404. In step 408, fixed length chains, variable length chains, and delimiter patterns are created by scanning the normalized document. Then, the fixed length chains, the variable length chains, delimiter patterns, the document number of the document, as well as the position numbers in the document of the fixed length chains, the variable length chains and the delimiter patterns are stored in the memory region obtained in step 402.

In step 408, as the fixed length chains, the variable length chains, the delimiter patterns, the document number and the position numbers in the document are being stored in the memory region previously obtained in step 402, the available space in the obtained memory region may become exhausted. Therefore in step 410, a process is performed for checking whether or not the obtained memory region is full. If so, in step 412, the fixed length chains, the variable length chains, and the delimiter patterns, all of which are stored in the memory region, and the document number of the document, as well as position information in the document of the fixed length chains, the variable length chains and the delimiter patterns are sorted based on, character code values of the fixed length chains, the variable length chains and the delimiter patterns, the document number, and the position numbers in document, for example. The sorted data is written to the disk 108 (FIG. 1) as an intermediate file, whereby the memory region in which data written in the intermediate file is stored is released for use in the subsequent process. Then, the process proceeds to step 414. On the other hand, if it is determined in step 410 that there still remains a space in the memory region, then the process immediately proceeds to step 414.

In step 414, it is determined whether there remain documents not yet read in step 404 in the database 202. If so, the process returns to step 404.

If it is determined in step 414 that all documents in the database 202 have been completely read, then the fixed length chains, the variable length chains and delimiter patterns, all of which are not written to the memory region obtained in step 402 and remain, and the document number of the document, as well as the position numbers in the document of the fixed length chains, the variable length chains and the delimiter patterns are also sorted based on the character code values of the fixed length chains, the variable length chains and the delimiter patterns, the document number, and the position numbers in the document, and written to the disk 108 (FIG. 1) as an intermediate file.

Since writing of the intermediate files in steps 412 and 416 causes a plurality of intermediate files to exist on the disk 108, and each of these intermediate files are previously sorted, step 418 performs a process to create the character chain file 302 and the position information file 304 shown in FIG. 3 from these intermediate files with conventional known merge/sort techniques, and to store them on the disk 108. In addition, since the character chain may repeatedly appear several times in the original intermediate files, a process is performed here to put the entries of the same overlapped character chain into one, and to associate the related document number and the position number in document to the character chain. Thereafter, the intermediate files are no longer necessary and are deleted.

Figure 6:
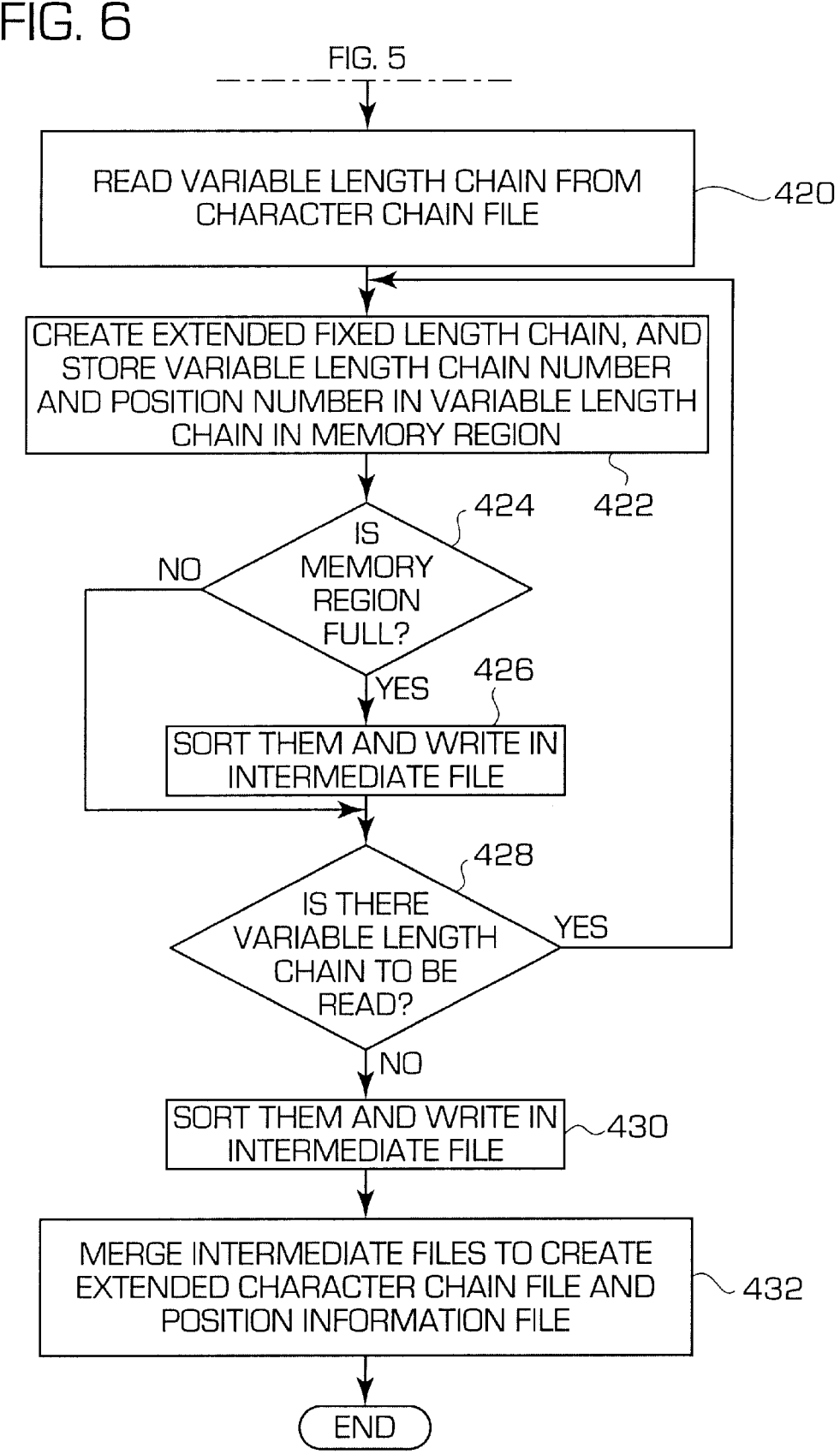

Referring to FIG. 6, in step 420, one variable length chain is read from the character chain file 302 into the memory region preferably obtained in step 402. In the preferred embodiment of the present invention, since the storage position of the variable length chain in the character chain file 302 is stored in the character chain file 302 at the time it is created, it is possible to immediately access the top position of the variable length chain in the character chain file 302.

In step 422, the extended fixed length chain is created by scanning the variable length chain. Then, the extended fixed length chain, the variable length chain number of that variable length chain, the position number in the variable length chain of the extended fixed length chain are stored in the memory region obtained in step 402.

In step 422, as the extended fixed length chain, the variable length chain number and the position number in variable length chain are being stored in the memory region previously obtained in step 402, the available space in the obtained memory region may become exhausted. Then, in step 424, a process is performed for checking whether or not the obtained memory region is full. If so, in step 426, the extended fixed length chains, the variable length chain number, and the position information in the variable length chain, all of which are stored in the memory region, are sorted based on character code values of the extended fixed length chains, the variable length chain number and the position number in the variable length chain, for example. The sorted data is written to the disk 108 (FIG. 1) as an intermediate file, whereby the memory region in which data written in the intermediate file is stored is released for use in the subsequent process. Then, the process proceeds to step 428. On the other hand, if it is determined in step 424 that there still remains a space in the memory region, then the process immediately proceeds to step 428.

In step 428, it is determined whether there remains variable length chains not yet read in step 420 in the character chain file 302. If so, the process returns to step 420. On the other hand, if it is determined in step 428 that all variable length chains in the character chain file 302 have been completely read, then the extended fixed length chains which are not written to the memory region obtained in step 402 and remain, the variable length chain number, and the position number in variable length chain are also sorted based on the character code values of the extended fixed length chains, the variable length chain number and the position number in variable length chain, and written to the disk 108 (FIG. 1) as an intermediate file.

Since writing of the intermediate files in steps 426 and 430 causes a plurality of intermediate files to exist on the disk 108, and each of these intermediate files are previously sorted, step 432 performs a process to create the extended character chain file 306 and the position information file 308 shown in FIG. 4 from these intermediate files with known conventional merge/sort techniques, and to store them on the disk 108. In addition, since the character chain may repeatedly appear several times in the original intermediate files, a process is performed here to put the entries of the same overlapped character chain into one, and to associate the related variable length chain number and the position number in variable length chain to that character chain. Thereafter, the intermediate files are no longer necessary and are deleted.

H. Search Process by Using Index File

Now, an example of a process for performing a character string search by using the index file created as above will be described by referring to the flowchart of FIG. 7. In step 502, first, a process is performed to display, a dialogue box with an input box, and to prompt the user to input a search character string in the input box. When the user inputs the search character string in the input box, and clicks the OK button or a return key, the search character string is normalized, if desired. In step 504, a fixed length chain and a variable length chain of N characters are created based on the same rule when the index file is created from that search character string.

In step 506, the fixed length chain is searched from the character chain file. In step 508, if it is determined that no fixed length chain is found, a message box is preferably displayed in step 526 for indicating that the search character string cannot be found, and the process ends.

In step 508, if it is determined that a fixed length chain is found, since the position information file returns one or more document numbers and at least one position number in the document at that document number, this information is once stored in step 510 in a predetermined buffer region in the main memory or on the disk for the subsequent process.

In step 512, it is determined whether all fixed length chains created from the search character string have been searched. If so, the process proceeds to step 514. If not, the process returns to step 506 where the search process is performed for the next fixed length chain by using the character chain file.

In step 514, a variable length chain is searched from the extended character chain file and the extended position information file. In this case, when variable length chains having excess characters before or after it are eliminated, it is possible to avoid noise such as "cat"→"communication". Specifically, in case where there are three or more characters before or four or more characters after a matched character string, it may be possible to eliminate these characters, to subtract a predetermined value from the similarity factor for one character existing before or after the matched character string as a penalty, or to multiply the similarity factor by a predetermined value (positive value less than one).

In step 516, if it is determined that no variable length chain is found, step 526 presents a message box indicating that no search character string is found, and ends the process. Although, in the preferred embodiment of the present invention, the message is displayed on the display device 110 of FIG. 1, it may be possible to transfer the message to another location through a network. On the other hand, if it is determined in step 516 that a variable length chain is found, because the extended position information file 308 returns one or more variable length chain numbers 316, the position information file 304 returns in step 518 one or more document numbers 312 for subsequent processing based on this information and at least one position number in document 314 at these document numbers which are then once stored in a predetermined buffer region in the main memory or on the disk.

In step 520, it is determined whether all variable length chains created from the search character string have been searched. If so, the process proceeds to step 522. If not, the process returns to step 514 where the search is performed with the next variable length chain by using the extended character chain file, and the extended position information file.

In step 522, a check is performed on the position information for the fixed length chains stored in the buffer in step 510 and the position information for the variable length chains stored in the buffer in step 518 to store the document numbers containing the character strings matching the search character string and their position numbers in the buffer region. If it is determined that the search character string is found, the contents of the documents in the database 202 are accessed in step 528 from these document numbers and the position numbers in the document, and the applicable lines of the document in which the document search character string exists are preferably displayed in the individual windows. If it is determined in step 524 that the search character string is not found, a message box indicating that the search character string is not found is preferably displayed in step 526, and the process ends.

In order to check that the search character string appears in a specific block in the document (for example, the third block), it is sufficient to count delimiter positions in the document which appear until reaching the position where the search character string appears in the document, to check at which block (x-th block) the search character string is positioned in the document, and to compare it with the specified block number.

I. Ambiguity Search Process

Figure 7:
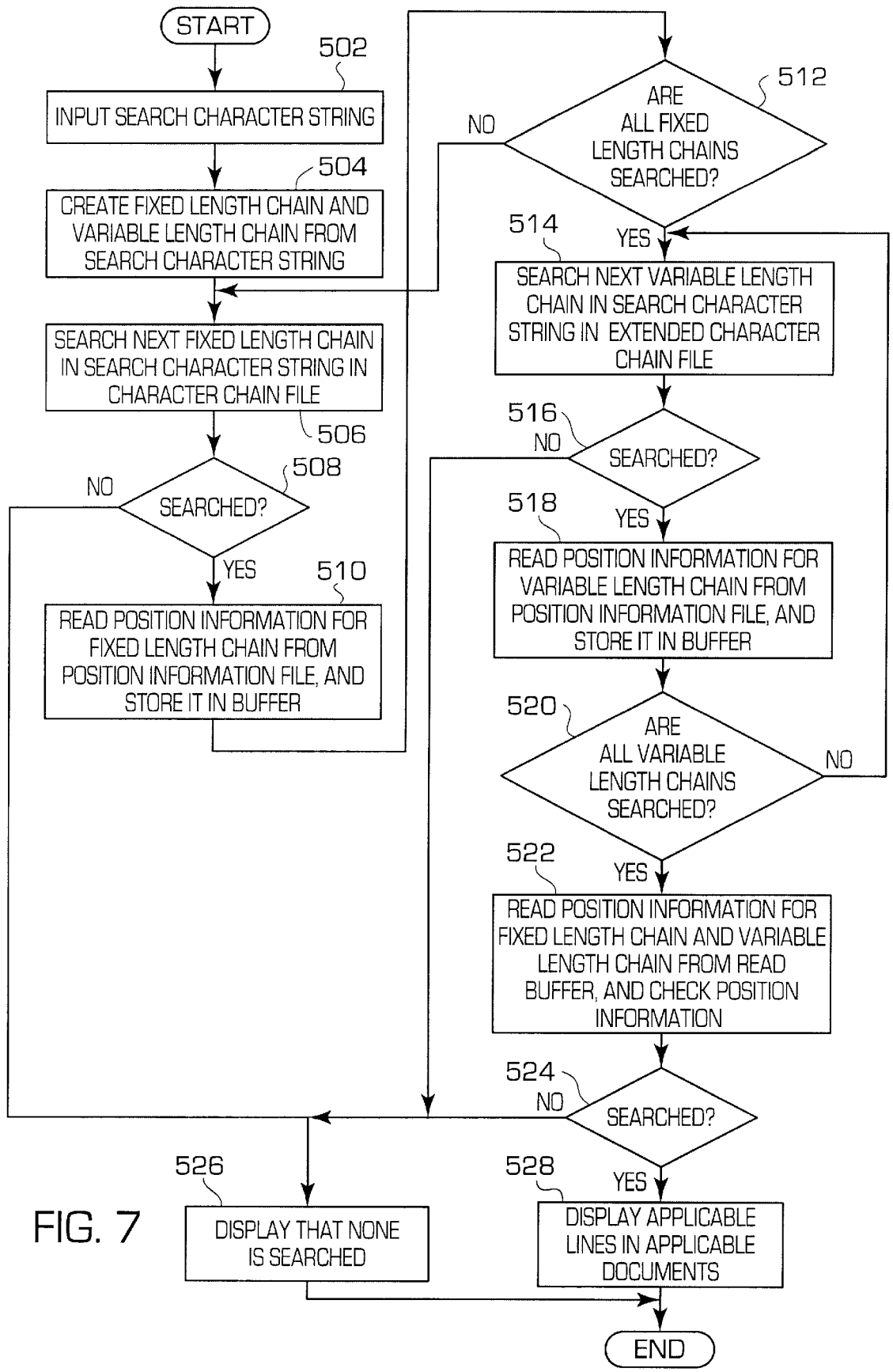
FIG. 7 is a flowchart of a character search process using the index file.

The process shown in FIG. 7 is to perform a so-called "strict search" by using the index file. However, according to the present invention, it is also possible to prepare a so-called "ambiguity search" process for character strings including those similar to a specified character string in individual documents in the database at a high speed by using an index file. Specifically, the ambiguity search scheme operates on a character string to be searched, and search accuracy (larger than zero but less than or equal to one) to identify documents including "similar character strings" of which the "similarity factor" with the character string to be searched is higher than the specified search accuracy and positions in the document of the "similar character strings".

I1. Using a Human-like Thought Process to Determine that Character Strings are Similar When English is a delimiter language, English character strings in which the arrangement of characters resemble each other include:
(1) Different expression
"database", "data base", "data-base"
(2) Inflection
"communicate", "communication"
(3) Typographical error
In case of "communication":
"communication": missing character
"communication": reversal of characters
"communication": excess character
(4) Hyphenation
"communication", "communi-cation"
(5) Variation of phrase
"new technology", "new CMOS technology"

In the above examples, most of the characters continuously match, but there is a missing character or an excess character or some other minor variation. Similar examples may be found in Japanese, Korean, and Chinese.

I2. Rule for Determining Similar Character Strings and Similarity Factor

First, description is provided for a case of a search character string consisting of only the fixed length chain according to a rule for determining similar character strings and a similarity factor. It is a general rule to collect character strings which have the same or a similar sequential relationship of characters in an input character string. To some extent, the selected character strings continuously match with the input character strings over M characters or more. From this, it is possible to determine a similarity factor from the number of matched characters and the number of non-matched characters.

Terms used in this description are defined.
Matched character string:

A section in which a character string to be searched continuously matches the document text over M characters or more. The longest character string is selected from those starting from a same character.
Example:

Character string to be searched: communication
Document text: . . . the communi- . . .

If M=2, "communi" is the matched character string. In this case, because of the longest selection, "com" or "commu" is not referred to a matched character string. In addition, "t" is also not a matched character string because it is less than two characters.

Valid matched character string:

It is a matched character string of M characters constituting a similar character string. A valid matched character string in a search character string is called a valid matched search character string; a valid matched character string in a document is called a valid matched document character string. Since the valid matched search character string and the valid matched document character string match for their contents, they are simply called a valid matched character string unless distinction is required.

Longest non-matched character string length L:

Non-matched characters to be contained in a similar character string should be continuous L characters. L is a constant of one or more.

Now, description is given on how to select a "similar character string" and how to digitize a "similarity factor".

(1) Determination of first valid matched character string

The first matched character string in a document is to be the first valid matched character string, where it is expressed that s (D, i) is the start position of the i-th valid matched document character string;

e (D, i) is the end position of the i-th valid matched document character string;

s (C, i) is the start position of the i-th valid matched search character string; and e (C, i) is the end position of the i-th valid matched search character string.

(2) Determination of next valid matched character string

When the i-th valid matched document character string has been determined, the (i+1)-th valid matched document character string is determined in the following manner.

The first matched character string satisfying the following two conditions a) and b) is made the (i+1)-th valid matched character string.

EQUATION 7

$$a) \ e(D, \ i)+1 \leq s(D, \ i+1) \leq e(D, \ i)+L+1$$

This means that up to L characters are allowed as excess characters which may exist between the i-th valid matched document character string and the (i+1)-th valid matched document character string.
(Refer to Example 2 described later.)

EQUATION 8

$$b) \ s(C, \ i+1) > e(C, \ i)-(M-1)$$

The process is continued until it is determined that such a valid matched document character string cannot be selected.

(3) Determination of "similar character string" and its "similarity factor" (degree of similarity)

When the valid matched document character string cannot be selected any more, a "similarity factor" is calculated from the following equation by assuming that a "similar character string" is from the first character of the first valid matched character string to the last character of the last valid matched character string.

EQUATION 9

Similarity factor= minimum (number of characters in a character string to be searched belonging to a valid matched search character string/number of characters of the character string to be searched, number of characters in a "similar character string" belonging to the valid matched document character string/number of characters of the "similar character string")

The similarity factor can be calculated from the number of characters not belonging to a valid matched document character string.

EQUATION 10

Similarity factor=1− maximum (number of characters in a character string to be searched not belonging to a valid matched search character string/number of characters of the character string to be searched, number of characters in a "similar character string" not belonging to the valid matched document character string/number of characters of the "similar character string")

I3. How to Count the Number of Characters in "Similar Character String" Belonging to Valid Matched Character String When two characters correspond to the same characters in the character string to be searched, the first character is counted as 1, and the second one is counted as 0.5. Otherwise, one character is counted as 1. (Refer to Example 3 described later.)

I4. Order of Determination of "Similar Character String"

The first "similar character string" is determined by starting comparisons from the top of document. When the i-th "similar character string" has been determined, the (i+1)-th "similar character string" is determined by starting comparisons from the first character which is behind a character at the top of the i-th "similar character string", and does not belong to a valid matched character string constituting the i-th "similar character string".

A "similarity factor" similar to general human thought determinations of similarity can be calculated on whether or not the arrangement of characters resemble each other by setting the constants L and M to suitable values. When the "similarity factor" becomes the maximum value of 1, the character strings completely match. When the character strings completely match, the "similarity factor" always becomes 1.

I5. Process Flowchart for an Ambiguity Search

Figure 8:
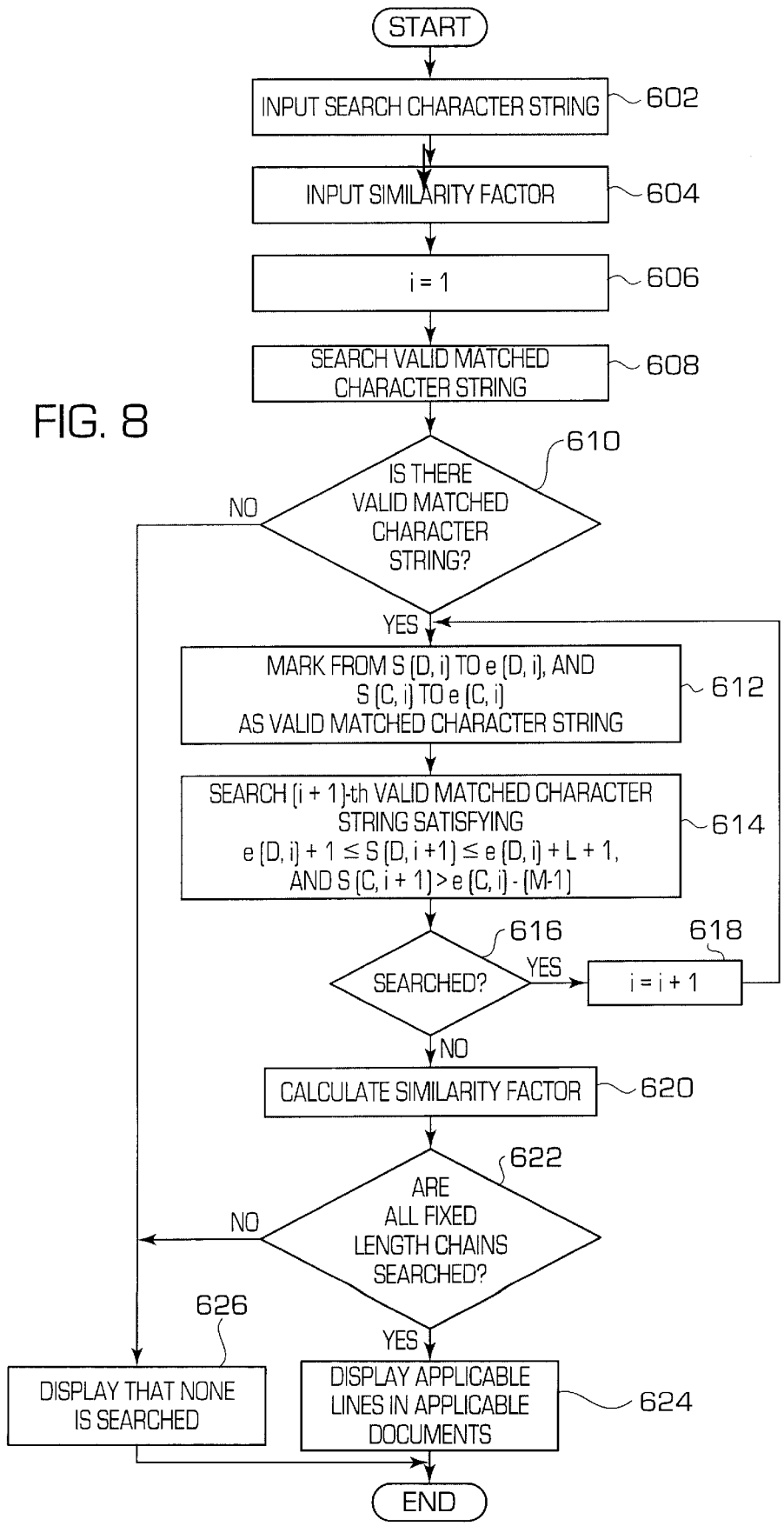
FIG. 8 is a flowchart of an ambiguity search process using the index file.

The above process is represented as a flowchart shown in FIG. 8. Referring to FIG. 8, in step 602, input of a search character string is prompted. In step 604, input of similarity factors of 0–1is prompted. Usually, input of the character string and the value in steps 602 and 604 are performed by using an input box and a scroll bar of a single dialogue box.

In step 606, the number i for a valid matched character string is set to 1. In step 608, the valid matched character string is searched. Now, if there is a condition that the length of valid matched character string is M characters or more, it is advantageous that an index file of M-character chains is created in the process of FIG. 7. This is because, if such index file previously exists, search for any M-character chain can be performed at a high speed by the dichotomized searching of the index file. Subsequently, search for an M-character chain is performed in the index file by shifting the start position for taking the M-character chain in the index character string by one. Then, if the resulting document number is the same as one previous search for the M-character chain, and the position number in the document is sequential, a valid matched character string with a length of M+1 would be obtained. Thus, whenever the condition that the document number is the same as one previous search for the M-character chain and that the position number in the document is sequential are satisfied, the length of valid matched character string is incremented by one. However, if nothing is found in the search for M-character chain using the index file, or if the document number being returned does not match, or if the position number in document becomes non-sequential, the end position of valid matched character string would be found.

Sometimes, no valid matched character string is found. In such a case, depending on the decision in step 610, the process proceeds to step 626, where it indicates that nothing is found and ends. When it is determined in step 610 that a valid matched character string is found, the process proceeds to step 612, and s (D, i) to e (D, i) in the document and s (C, i) to e (C, i) in the search character string are marked as the valid matched character string.

In step 614, the (i+1)-th valid matched character string satisfying the conditions a) $e(D, i)+1 \leq s(D, i+1) \leq e(D, i)+L+1$, and b) $s(C, i) > e(C, i)-(M-1)$ is searched using the index file. If found, the process returns to step 612 where, for the (i+1)-th valid matched character string, s (D, i+1) to e (D, i+1) in the document and s (C, i+1) to e (C, i+1) in the search character string are marked as a valid character string (increment of i is indicated in step 618).

On the other hand, if a valid matched character string is not found in step 616, a similarity factor is calculated in step 620. The similarity factor is determined by the exemplary condition.

Similarity factor= minimum (number of characters in a character string to be searched belonging to a valid matched character string/ number of characters of the character string to be searched, number of characters in a "similar character string" belonging to the valid matched character string/number of characters of the "similar character string")

In this case, the "similar character string" is a character string from the start position of the first valid matched character string in the document to the last position of the last valid matched character string.

In step 622, results are selected from the similarity factor calculated in step 620 and that input in step 604. Only results with the similarity factor equal to or higher than that input in step 604 are displayed in step 624.

In step 624, a process is performed to access contents of the documents stored in the database based on the document numbers and the position numbers in the document returned as the result of searches of the index file in steps 608 and 614, and to display lines containing applicable sections.

Although the "similar character string" for one search character string may be simultaneously found in a plurality of documents, it may be found at a plurality of sections even in a single document. Accordingly, it should be noted that steps 606–622 are applied to each of such plurality of "similar character strings", and, in step 624, only those of the plurality of "similar character strings" satisfying the conditions for similarity factor are selected and displayed.

I6. Examples of Determination on "Similar Character String" and Similarity Factor Examples are given with M =2, and L =3.

EXAMPLE 1

```
                            123456
        Character string to be searched C: ABCDEF
                         12345678 . . .
                    Document D: AB.CD.EF . . .
```

Since the longest character string first matched is "AB", the first valid matched character string is "AB"

$s(C, 1) = 1 \quad e(C, 1) = 2$ $s(D, 1) = 1 \quad e(D, 1) = 2$.

Since e (C, 1)–(M–1)=1, the second valid matched character string is searched by comparing a character string starting at or after the second character in the character string to be searched with a character string starting at the third, fourth, fifth or sixth character in the document (because e (D, 1)+1=3, and e (D, 1)+L+1=6).

Second valid matched character string "CD"

$s(C, 2) = 3 \quad e(C, 2) = 4$ $s(D, 2) = 4 \quad e(D, 2) = 5$

Since e (C, 1)–(M–1)=3, the third valid matched character string is searched by comparing a character string starting at and after the fourth character in the character string to be searched with a character string starting at the fifth, sixth, seventh or eighth character in the document (because e (D, 2)+1=5, and e (D, 2)+L+1=8).

Third valid matched character string "EF"

$s(C, 3) = 5 \quad e(C, 3) = 6$ $s(D, 3) = 7 \quad e(D, 3) = 8$

Since the end of the character string to be searched is reached, the third is the last valid matched character string.

TABLE 4

| AB CD EF |
|---|
| 1   2   3 |
| AB · CD · EF . . . |
| 1    2    3 |

Numerals are the number of valid matched character string.

Therefore, the "similar character string" is "AB●CD●EF" from s (D, 1) to e (D, 3).

"Similarity factor"=minimum (6/6, 6/8)=6/8=0.75

EXAMPLE 2

TABLE 5

| 1234 |
|---|
| Character string to be searched C: ABCD |

TABLE 6

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Document D: | A | B | X | X | X | X | C | D | X | X | X | X | X | X | . |

Since the longest character string first matched is "AB",

First valid matched character string is "AB"    $s (C, 1) = 1 \quad e (C, 1) = 2$
                                                                                                     $s (D, 1) = 1 \quad e (D, 1) = 2$ The second valid matched character string is searched by comparing a character string starting at the third, fourth, fifth or sixth character in the document (because e (D, 1)+1=3, and e (D, 1)+L+1=6) with a character string starting at or after the second character in the character string to be searched (because e (C, 1)−(M−1)=1).

Since the second valid matched character string is not found, and the end of the character string to be searched is reached, the valid matched character string is only the first one.

TABLE 7

ABCD
1
ABXXXXCDXXXXXX.
1

Therefore, the first "similar character string" is "AB" from s (D, 1) to e (D, 1).

"Similarity factor"=minimum (2/4, 2/2)=2/4=0.5

The first non-valid matched character after "A" is "X". When the second "similar character string" after "X" is searched:

TABLE 8

ABCD
1
ABXXXXCDXXXXXX.
1

However, since "AB" and "CD" are separated by four characters in the document, and L=3 in this example, the above "CD" is not considered as a valid matched character string.

EXAMPLE 3

TABLE 9

123
Character string to be searched C: ABC
123456789
Document D: XABBCXXXX

Since the longest character string first matched is "AB":

EQUATION 11

First valid matched character string is "AB"   s (C, 1) = 1   e (C, 1) = 2
                                               s (D, 1) = 2   e (D, 1) = 3

The second valid matched character string is searched by comparing a character string starting at or after the second character in the character string to be searched (because e (C, 1)−(M−1)=1) with a character string starting at the fourth, fifth, sixth or seventh character in the document (because e (D, 1)+1=4, and e (D, 1)+L+1=7).

Second valid matched character string is "BC"   s(C, 2) = 2   e(C, 2) = 3
                                                 s(D, 2) = 4   e(D, 2) = 5

Since the end of the character string to be searched is reached, there are two valid matched character strings.

TABLE 10

ABC
1
2
XAB   BCXXXX
1     2
1,1,   0.5,1−>3.5

The "similar character string" is "ABBC" from s (D, 1) to e (D, 2). "Similarity factor"=minimum (3/3, 3.5/4)=3.5/4= 0.875

I8. Search of Variable Length Chain

The method for searching a similar character string is described in the above for a case of a search character string consisting of only fixed length chains. When this is extended to a search character string containing variable length chains, the search proceeds as follows. Here, a variable length chain taken out from the search character string is called an extended search character string.

First, the following extended character chain is obtained by searching for an extended character chain file, and an extended position information file. The searching method is the same as the method for searching a search character string consisting of only fixed length chains from a character chain file and a position information file. M' is used as a one corresponding to the constant M.

(1) Searching a variable length chain matching an extended search character string with a specified search matching factor or higher. In this case, eliminating variable length chains not matching the first character in the extended search character string is effective to reduce noise. In this case, in creating an extended fixed chain, high speed processing can be performed by using a symbol such as "$" indicative of a start, creating an extended fixed chain of "$co", and eliminating variable length chains not matching it. However, even when "$" indicative of start is not used, it is possible to identify a start position of the variable length chain from a position number in variable length chain or information on the delimiter in the extended position information file.

EXAMPLE 4

Extended search character string: "communication"

Found variable length chain: "communication"

(2) Searching a variable length chain matching an extended search character string which is newly created by joining extended search character strings with a specified search matching factor or higher

EXAMPLE 5

Search character string: "data-base"

Extended search character string: "data", "base"

Extended search character string created by joint: "database"

It may be possible to set the number of joints in a string up to two or three. This process enables the search to locate the joined "database" from character strings in a document even in a case of a divided search character string such as "data base".

(3) Searching variable length chains satisfying all the following conditions from variable length chains matching extended search character string with a matching factor larger than 0.

The first character in variable length chain is included in the matched section.

TABLE 11

[Example 6] (underline under matched section)

| Extended search character string | Variable length chain |
|---|---|
| "data_base_" | -> o  "data" |
| "data_base_" | -> x  "up_date_" |
| "data_base_" | -> o  "_base_" |

The first or last character in extended search character string is included in the matched section.
In this case, the process can be performed at a high speed by creating an extended fixed chain of "$co" and "seŸ" through use of "$" indicative of a start and "Ÿ" indicative of an end in creating the extended fixed chain, and by eliminating variable length chains not matching either of them.

TABLE 12

[Example 7] (underline under matched section)

| Extended search character string | Variable length chain |
|---|---|
| "data_base_" | -> o  "data" |
| "data_base_" | -> o  "_base_" |
| "data_base_" | -> x  "tab" |

This process enables the location of the divided "data" and "base" from character strings in a document even in a case of a joined search character string such as "database". When a variable length chain contains non-matched characters in the number equal to or more than a predetermined number of characters, such as when the first character in the extended search character string is included in the matched section (the variable length chain "data" for the extended search character string "database" being an example), or when the last character in the extended search character string is included in the matched section (the variable length chain "base" for the extended search character string "database" being an example), such variable length chains may be excluded from the subject for search. This enables the method to increase the search speed by narrowing down the subjects for search.

In the preferred embodiment of the present invention, the variable length chain subject to the processes (1), (2) and (3) described above (that is, (1)+(2)+(3)) becomes the "variable length chain satisfying the conditions" in step 708. (FIG. 9) However, the conditions may be variously changed to be (1) only, (3) only, (1)+(2) or the like through setting instead of the conditions (1)+(2)+(3).

In determining the matching factor for searching an extended index by looking for the variable length chains of (1), (2) and (3), if an evaluation lower than normal matching but higher than normal non-matching is given due to reversal of characters, it is effective to search a word in which position of characters is reversed, which is often found in a typographical error of an English word.

TABLE 13

[Example of reversed characters]

| "commu_nication" | <-> | "comm_n_uication" |
|---|---|---|

In this example, a non-matched character string in the search character string is "un", while a non-matched character string in the document character string is "nu". In such a case, such non-matching caused by typographical error can be detected by determining, for example, whether or not "u" and "n" of the non-matched character string in the search character string are contained in the non-matched character string in the document character string.

Figure 9:
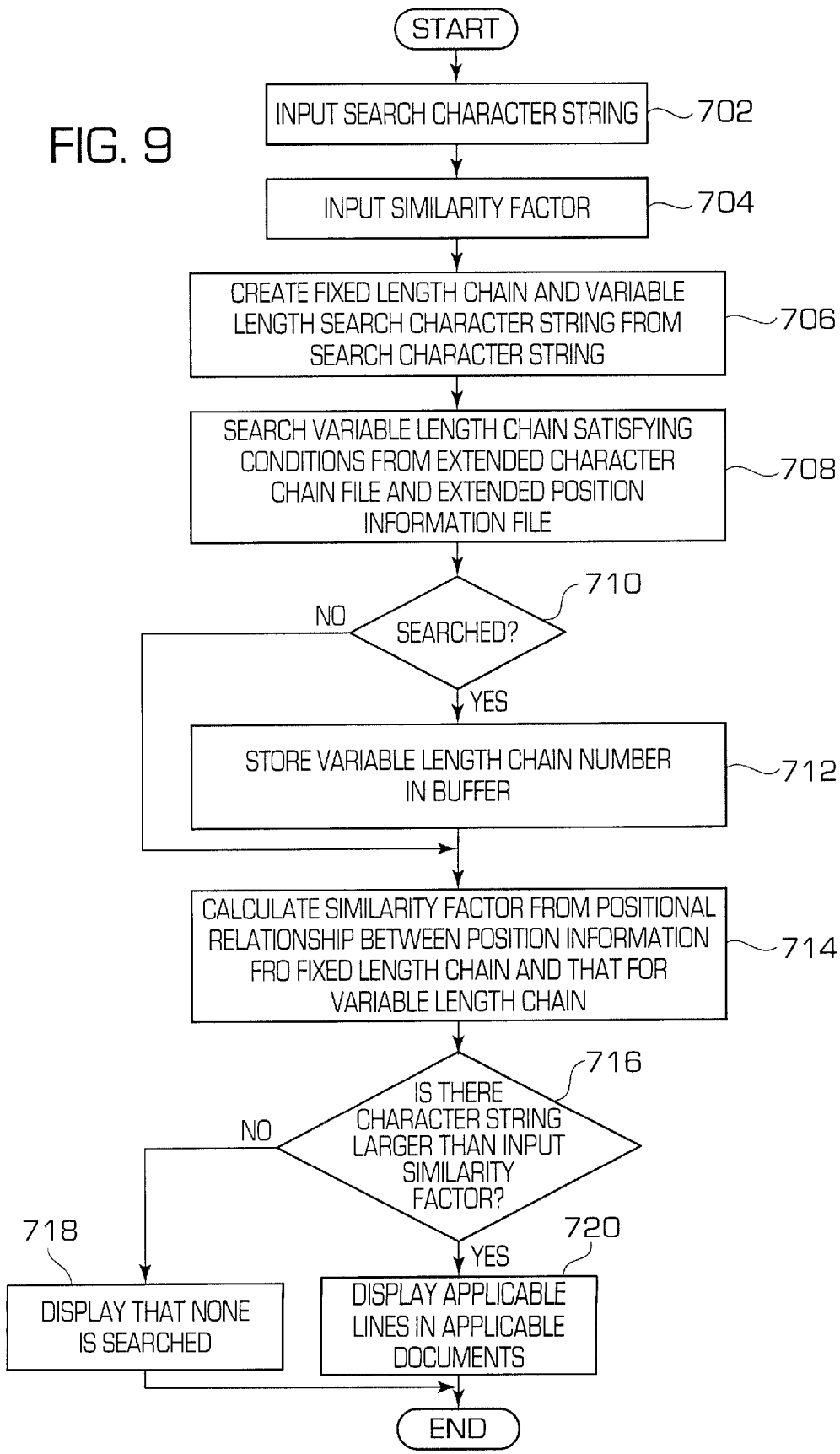
FIG. 9 is a flowchart of an ambiguity search process using the index file.

The search method for a search character string containing such a variable length chain is performed in the procedure shown in FIG. 9. This procedure is described with reference to an embodiment of the invention. In this embodiment, search characters are "data communication", and "data . . . communication", "data communication", and "daily communication" exist in a document character string. It is assumed that "data" and "communication" in "data . . . communication" are sufficiently separated.

Information on a character chain file and on a position information file are assumed to be as follows (M'=3):

| Character chain file | Position information file |
|---|---|
| 1. data | 1-1, 2-1 |
| 2. daily | 3-1 |
| 3. communication | 2-6 |
| 4. communication | 1-35, 3-7 |
| Extended character chain file | Extended position information file |
| $da | 1-1, 2-1 |
| dat | 1-2 |
| taŸ | 1-3 |
| aŸ | 1-4 |
| dai | 2-2 |
| ail | 2-3 |
| ily | 2-4 |
| lyŸ | 2-5 |
| yŸ | 2-6 |
| $co | 3-1, 4-1 |
| com | 3-2, 4-2 |
| omm | 3-3, 4-3 |
| mmi | 3-4 |
| min | 3-5 |
| inu | 3-6 |
| nuc | 3-7 |
| uca | 3-8 |
| cat | 3-9, 4-9 |
| ati | 3-10, 4-10 |
| tio | 3-11, 4-11 |
| ion | 3-12, 4-12 |
| onŸ | 3-13, 4-13 |
| nŸ | 3-14, 4-14 |
| mmu | 4-4 |
| mun | 4-5 |
| uni | 4-6 |
| nic | 4-7 |
| ica | 4-8 |

Here, for the purpose of easy understanding, an unsorted file is shown. Here, in "1. data 1-1, 2-1", "1." indicates the variable length chain number, "data" indicates a variable length chain, and "1-1" and "2-1" indicate document number-position number in the document. In addition, in "$da 1-1, 2-1", "$da" indicates an extended character chain, and "1-1" and "2-1" indicate variable length chain number-position in the variable length chain. Accordingly, "$da 1-1, 2-1" represents the first character in a variable length chain number 1 (data) and the first character in variable length chain number 2 (daily).

When the procedure of FIG. 9 is started, a search character string "data communication" is input (step 702). Then, a similarity factor is input (step 704). It may be possible to set this similarity factor to a default, and to omit its input. In this example, here, a similarity factor of 0.80 is used.

Then, a fixed length chain and a variable length search character string are created from the search character string (step 706). In this example, since the description is made on a document consisting of only a delimiter language, there is no fixed length chain.

Variable length chains satisfying the conditions are searched from the extended character chain file and the extended position information file (step 708). Here, a process is performed for searching variable length chains according to the processes (1), (2) and (3). That is, (1) search is performed for a variable length chain matching an extended search character string with a specified search matching factor or higher. While the search matching factor in this case may be set to the same value as the similarity factor for the entire character string, it is preferable to be lower than the similarity factor for the entire document.

For example, since "communication" and "communication" match for 10 characters in 13 characters, and three characters do not match, the similarity factor is 10/13=0.77 using a simple calculation method for the similarity factor. (Here, for easy understanding by the reader, description is made by using the simple calculation method for similarity factor. However, other calculations may also be used). The similarity factor between "data communication" and "data communication" is 15/18=0.83 in the simple calculation method of similarity because they match for 15 characters in 18 characters including delimiter, and three characters do not match. Thus, there are many cases where the similarity factor for entire character string becomes higher even if the similarity factor between the variable length chains is low, and this tendency becomes more significant when the character string becomes longer.

In this embodiment, the "specified search matching factor" is set to 0.60 for "data" and 0.72 for "communication". The "specified search matching factor" may be changed depending on the ratio of the number of characters in the search character string to that in the variable length chain. This is because, as shown in this example, while the similarity factor for an entire character string does not become 0.80 or higher unless the variable length chain matches "communication" for 10 characters or more, there is a possibility that, for "data", the similarity factor for entire character string becomes 0.80 or higher even if only one character matches. However, if too low a matching factor is allowed for "data", the number of matched variable length chains increases and the search speed is affected so that 0.6 is set as the lower limit. In addition, in the preferred embodiment of the present invention, variable length chains not seriously affecting the similarity factor for the entire document are excluded from the subject for variable length chain searching of (1). This enables the present search method to improve the search speed.

In the embodiment, a high speed search is made possible by excluding variable length chains which have a number of characters less than the similarity factor×number of characters of variable length chain to be searched (=0.72×13=9.36) from the subject for search. This is attained by controlling the number of characters of the variable length chain as follows:

| Extended character chain file | Extended position information file |
|---|---|
| $da | 1-1-4, 2-1-5. |

"1-1-4" and "2-1-5" in "$da 1-1-4, 2-1-5" indicate "variable length chain number-position in the variable length chain-number of characters in the variable length chain".

As variable length chains having the search matching factor of 0.60 or higher for "data" and 0.72 or higher for "communication", "data" (100%) can be found for "data", and "communication" (77%) and "communication" (100%) can be found for "communication" by a method similar to that for a fixed length chain.

In the case of a search character string "communication", for example, chains matching a corresponding extended search character string are the following in the extended character chains:

| Extended character chain file | Extended position information file |
|---|---|
| $co | 3-1, 4-1 |
| com | 3-2, 4-2 |
| omm | 3-3, 4-3 |
| mmi | 3-4 |
| min | 3-5 |
| inu | 3-6 |
| nuc | 3-7 |
| uca | 3-8 |
| cat | 3-9, 4-9 |
| ati | 3-10, 4-10 |
| tio | 3-11, 4-11 |
| ion | 3-12, 4-12 |
| on¥ | 3-13, 4-13 |
| n¥ | 3-14, 4-14 |

Then, "3. communication" and "4. communication" in the character chain file can be found from the information on the extended position information file.

Then, (2) search is performed for a variable length chain matching an extended search character string which is newly created by joining extended search character strings with a specified search matching factor or higher. Therefore, variable length chains matching the search character string "datacommunication" with a specified search matching factor or higher are searched. In this case, while the "specified search matching factor" may be set to the same value as the similarity factor for entire character string, it may be lower than the similarity factor for the entire document. For example, when the search character string is "data base system", there exist three extended search character strings created by the joining: "database", "basesystem" and "databasesystem". Impact of these joined search character strings on the similarity factor for the entire document varies depending on the number of characters in the joined search character strings. In the embodiment, because the "specified search matching factor" of (2) is set to 0.80, there is no variable length chain matching the search character string "datacommunication" with the specified search matching factor or higher.

Then, variable length chains satisfying the conditions of "1. the first character of variable length chain is contained in the matched section", and "2. the first or last character of extended search character string is contained in the matched section" are searched in (3) variable length chains matching the extended search character string with the matching factor of 0 or higher. The variable length chains meeting these conditions are "data", "communication" and "communication".

Referring to FIG. 9 again, in step 710, it is determined whether or not a variable length chain is found. In the embodiment, "1. data", "3. communication" and "4. communication" have been found. Numbers of these variable length chains are stored in a buffer (step 712). In the embodiment, the variable length chain numbers 1, 3, and 4 are stored. In the preferred embodiment of the present invention, the variable length chain character strings "data" and "communication" of the search character string "data communication" are respectively assigned a number (variable length chain search character string number). The variable length chain numbers 1, 3 and 4 are stored in connection with such numbers. Therefore, the information being stored is (1-1) and (2-3, 4). Here, (2-3, 4) indicates the variable length chain numbers 3 and 4 of the variable length chains in the document matching the variable length chain search character string number 2 with a certain matching factor or higher.

Then, in step 714, the similarity factor for the entire character string is calculated from the positional relationship between the position information of the fixed length chain and the position information of the variable length chain. Specifically, as described above, the variable length chain numbers 1, 3 and 4 in the document are stored for the variable length chain search character string number. Therefore, the variable length chains in the document which may be joined are 1-3 and 1-4 ("1." corresponds to "data", "3." to "communication", and "4." to "communication").

Since, when the contents of the character chain file 302 and the position information file 304 are referenced,

| Character chain file | Position information file |
|---|---|
| 1. data | 1-1, 2-1 |
| 3. communication | 2-6 |
| 4. communication | 1-35, 3-7, | combinations of (1-1, 2-1)-(2-6), and (1-1, 2-1)-(1-35, 3-7) become candidates. More particularly, combinations of (1-1)-(2-6),
(2-1)-(2-6),
(1-1)-(1-35),
(1-1)-(3-7),
(2-1)-(1-35), and
(2-1)-(3-7)

become candidates.

However, cases where (1) document numbers are different, where (2) condition L=3 is not satisfied, and where (3) position numbers in the document are reversed are excluded from the candidates for the calculation of similarity factor. The combination of variable length chains meeting such conditions is only (2-1)-(2-6). Therefore, "data communication" is calculated for the similarity factor. The conditions where "2. condition L=3 is not satisfied", and where "3. position numbers in document are reversed" are employed for a case where order is important as in "data communication", but are not employed for a case where order is not important as in searching for character strings which are extraction of keywords (variable length chains) in the abstract from a patent specification.

In the above description, in step 712, the variable length chain numbers are stored in connection with the variable length chain search character string numbers. However, storing the variable length chain search character string numbers is not an essential component of the present invention. Combinations of variable length chains can be determined without information on the variable length chain search character string numbers.

This is specifically described. The contents of the character chain file 302 and the position information file 304 are referenced from the stored variable length chain numbers in step 712.

| Character chain file | Position information file |
|---|---|
| 1. data | 1-1, 2-1 |
| 3. communication | 2-6 |
| 4. communication | 1-35, 3-7 |

The character chain file is divided according to the contents of the position information file.

| Character chain file | Position information file |
|---|---|
| 1. data | 1-1 |
| 1. data | 2-1 |
| 3. communication | 2-6 |
| 4. communication | 1-35 |
| 4. communication | 3-7 |

Then, the character chain file is sorted according to the contents of the position information file.

| Character chain file | Position information file |
|---|---|
| 1. data | 1-1 |
| 4. communication | 1-35 |
| 1. data | 2-1 |
| 3. communication | 2-6 |
| 4. communication | 3-7 |

If L=3, it is found that, in view of the contents of the position information file, 1. data 1-1,
4. communication 1-35, and
4. communication 3-7 have no other variable length chains to be combined.

On the other hand, because 1. data 2-1, and
3. communication 2-6 satisfy the condition L =3, they are combined and determined for the similarity factor.

Therefore, the candidates for the calculation of similarity factor are:

1. data 1-1,
4. communication 1-35,
4. communication 3-7, and
1-3. data communication 2-1

To prevent duplicated calculation of similarity factor, they are arranged by the variable length chain number.

1. data 1-1
4. communication 1-35, 3-7
1-3. data communication 2-1

Then, character strings less than search character string (18: including delimiter)×similarity factor (0.80) (character strings less than 14.4) are excluded from the subject for calculation of similarity factor. (In practice, it is desirable to perform the calculation before they are arranged by the variable length chain number). Accordingly, the candidates for the calculation of similarity factor become only 1-3. data communication 2-1.

Since the search character string "data communication" matches "data communication" for 15 characters of 18 characters, and three characters do not match, the similarity factor between them is calculated as 0.83.

The calculation of similarity factor for character string in step 714 can be reduced by storing the similarity factor of variable length chain together with the variable length chain numbers in step 712. That is, (1-1.00), (3-0.77) and (4-1.00) are stored in step 712 and utilized.

In the simple calculation method of similarity factor, the similarity factor is possible to be calculated from the following equation.

Similarity factor=(number of characters in variable length chain 1×matching factor of variable length chain 1+number of characters in variable length chain 2×matching factor of variable length chain 2+ . . . +number of characters of delimiter)/(number of characters in search character string)

Accordingly, the similarity factor of the embodiment is (4×1.00+13×0.77+1)/18=0.83. Whether or not the delimiter is counted as one character may be changed by design.

Then, in step 716, the input similarity factor is compared to the calculated similarity factor. If there exists no character string with similarity factor higher than the input similarity factor, a display indicating that none is found is displayed on the display 110 (step 718). If it is found, applicable line(s) in applicable document(s) is displayed (step 720). However, the display indicating that none is found and the display of applicable line(s) in applicable documents are not essential components, and this information may be transmitted to another computer (including a client). In addition, the display of applicable line(s) in applicable document(s) may display all character strings with the input similarity factor or higher together with their similarity factor, document numbers, position numbers in document and the like, or to display only predetermined numerals. The order of display may be the sequence of appearance in the document(s) or in the descending order of similarity factor. Moreover, in case of multiple documents, it may be possible to display predetermined numerals for character strings satisfying conditions in each document. This can be set variously in the design stage.

While an approach has been described for use in the ambiguity search, the present invention may also be applied to spell checking of words in a document. In this case, a word in the document not existing in a dictionary is detected by the conventional approach. Then, the detected word not existing in the dictionary is used as a search character string, and the ambiguity search is performed for words existing in the dictionary. Then, words with a certain similarity factor or higher in the ambiguity search are displayed as candidates to correct the spelling for the word not existing in the dictionary.

Search for character strings consisting of only variable length chains has been described above. For a document in which variable length chains and fixed length chains are intermixed, the similarity factor for the entire character string is calculated in step 714 from the positional relationship between the position information for the fixed length chain and the position information for the variable length chain. This process is described by example. In the embodiment, there exists a search character string "ASEAN123" while "ASEA012" exists in the document. "ASEAN" and "ASEA" are variable length chains.

In the example, the contents of the character chain file 302 and the position information file 304 are:

| Character chain file | Position information file |
|---|---|
| 1. ASEA | 1-1 |
| 2. 01 | 1-5 |
| 3. 12 | 1-6 |

A variable length chain document character string "ASEA" similar to the variable length chain search character string "ASEAN" has been found by the above-mentioned method. For this character string, detection of a valid matched character string and calculation of similarity factor are performed in a similar manner to the method described for a fixed length chain.

EXAMPLE 8

TABLE 14

| Character string to be searched | C: | 12345678<br>ASEAN123<br>1234567 |
|---|---|---|
| Document | D: | ASEA012 |

TABLE 15

ASEAN123
1   2
ASEA012
1   2
Similar character string = "ASEA012"
Similarity factor = minimum (6/8, 6/7) = 0.75

As described for the calculation of the similarity factor for a character string containing only variable length chains, the result of calculation of the similarity factor for variable length chains may be used for the calculation of the similarity factor for the entire character string. In the simple calculation of similarity factor, the similarity factor may be calculated from the following equation.

EQUATION 12

Similarity factor=(number of characters in variable length chain 1×matching factor of the variable length chain 1+number of characters in valid matched character string of fixed length chain+number of characters of delimiter)/number of characters in search character string Accordingly, the similarity factor of the search character string in the embodiment is (5×0.80+2+0)/8=0.75, and the similarity factor of the document character string is (4×0.80+2+0)/7=0.74. Thus, the similarity factor of the search character string is:

Similarity factor=minimum (0.75, 0.74)=0.74

In this calculation of similarity factor, the calculation may be performed by changing weight for the variable length chain and the fixed length chain. For example,

EQUATION 13

Similarity factor=(number of characters in variable length chain 1×matching factor of variable length chain 1×0.5+ number of characters in valid matched character string of fixed length chain+number of characters of delimiter×0.2)/

(number of characters in search character string×0.5+ number of characters in fixed length chain in search character string+number of characters of delimiter in search character string×0.2)

E9. Application to Search Equation

The above-mentioned search is one example for a fixed character string. A case where it is applied to a search equation is described. For example, in a search equation such as (computer OR system) AND communication (a search equation searching for a document containing "computer" or "system", and containing "communication"), it is conceived to perform an ambiguity search by specifying a search matching factor for each search character string. When the search is performed for every search character string with the matching factor of 80% or higher, for example, the following documents may be found:

a document containing "computer" and "communication", and a document containing "sys-tem" and "communication"

In addition, when the found documents are arranged in descending order of the documents most likely to be the desired documents to be located, it is possible to use the matching factor obtained as the result of search as a cue.

E10. Relationship Between Structure of Index and Search for "Similar Character String"

Ambiguity search for a "similar character string" can be attained at a considerably high speed with the structure of an index file according to the present invention by suitably determining the value of M.

Determination of constants N and M

TABLE 16

| N: | Number of characters in character chain to be stored in index |
|---|---|
| M: | Shortest length of valid matched character string in ambiguity search |
| L: | Longest length of non-valid matched character string in "similar character string" in ambiguity search |

Although, if the values of N and N' are increased, the number of types of character chains increases, volume of data decreases per one character chain, and the search can be performed at a higher speed, the capacity of the index file increases. Sufficient search speed is obtained at N=2 and N'=3 for average documents in Japanese, Chinese, Korean, and English.

In addition, if M and M' are determined to be M≧N and M'≧N', sufficient search speed is obtained in the ambiguity search. In view of the fact that the smaller M and M' are, the finer search can be attained, it is believed to be desirable to set M=N and M'=N'.

E11. Second Embodiment for Determining Similarity Factor

The ambiguity search of the second embodiment is particularly considered for equilibrium between the principles that (1) "the more number of non-matched characters is inserted, the less similarity one feels" and (2) "when too many non-matched characters are inserted, then it cannot be felt to be one character string". When a character string matching an input character string, a non-matched character string and a matched character string are arranged in a document, it is unnatural that the degree of similarity is lowered when the character strings up to the latter matched character string are taken as a similar character string. For example, when the input character string is "ABCD", and the document 1 contains "ABXXXCD", and the document 2 contains "AB", ""ABXXXCD" is a similar character string in the document 1, and "AB" is that in the document 2. It would be unnatural to consider that the degree of similarity is higher for "AB" (document 2) than "ABXXXCD" (document 1), because document 1 contains an additional matched character string of "CD". Therefore, it would not be expected for document 1 to be evaluated to have a lower degree of similarity. It is more natural to consider that either the degree of similarity for "ABXXXCD" is higher than "AB", or the similar character strings in the document 1 are both "AB" and "CD".

Now, the process of the second embodiment is described. Referring to the flowchart of FIG. 8, in this embodiment, steps 602–612 are the same as before, and the process for step 614 for indicating the conditions in searching the (i+1)-th valid matched character string is changed as follows:

EQUATION 14

$$s(C, i+1) > e(C, i) - (M-1) \quad \text{(Equation A)}$$

$$s(D, i+1) > e(D, i) \quad \text{(Equation B)}$$

and $$s(D, i+1) - e(D, i) - 1 + \max(e(C, i) - s(C, i+1) + 1, 0) \leq L \quad \text{(Equation C)}$$

Definitions of s (C, i), e (C, i), s (D, i), e (D, i) and the like are the same as above.

Equation A means that duplicatively appearing characters are allowed up to M−1 characters. Otherwise, character strings appearing in the same order as that of characters in the input character string are made valid.

Equation B means that valid matched character strings do not overlap each other in the document.

Equation C means that inserted non-matched characters and duplicatively appearing characters are allowed up to L characters together.

In this embodiment, instead of calculating the ratios regarding the number of characters of a valid matched character and similar character strings in the document, and selecting the smaller one as the similarity factor as in the previous embodiment, the similarity factor is calculated by giving marks to similar character strings and dividing these assigned marks by the full mark (mark when string is completely matched). The mark for similar character string is calculated by giving a mark to each character under the following rule, and adding them. Accordingly, the process in step 620 of FIG. 8 becomes as follows.

| | |
|---|---|
| Character belonging to the first valid matched character string | 1 point |
| Character belonging to the i-th (i > 1) valid matched character string, and position in search character string_† e (C, i−1) + 1 (Equation D) | 1 point |
| position in search character string _... e (C, i−1) (Equation E) | −1/(2*L) point |
| Character not belonging to valid matched character string | −1/L point |

Also in this embodiment, when the i-th similar character string has been determined, the (i+1)-th similar character string is determined by starting comparisons from the first character after the top character in the i-th similar character string and not belonging to the valid matched character string constituting the i-th similar character string.

The negative point for the character not belonging to the valid matched character string is set by taking into account the equilibrium between "the more number of non-matched characters is inserted, the less similarity one feels" and "too much non-matched characters are inserted, then it cannot be felt to be one character string". The maximum total of negative points for one non-matched character string is $1/L*L=1$, and the minimum positive point is $N \geq 1$ when taking in the next matched character string (2 is particularly recommended for Japanese). Thus, the negative points never exceed the positive points. In addition, Equation E corresponds to point deductions for a duplicatively appearing character, while Equation D indicates a simple matched character, not a duplicatively appearing character. A case where a character duplicatively appears is accommodated by giving to a character expressed by Equation E a negative mark smaller than that for a simple non-matched character.

E12. Example of Determination of Similar Character String and Degree of Similarity in the Second Embodiment An example is shown also for N=2, and L=3.

TABLE 17

| [Example 9] | |
|---|---|
| | 123456 |
| Input character string C: | APCDEF |
| | 12345678 |
| Part of document D: ... | AB · CD · EF ... |

Since the first matched character string is "AB", the first valid matched character string is "AB".

$s(C, 1) = 1 \quad e(C, 1) = 2$ [Equation 15]

$s(D, 1) = 1 \quad e(D, 1) = 2$

According to Equations A, B and C, the second valid matched character string is "CD".

$s(C, 2) = 3 \quad e(C, 2) = 4$ [Equation 16]

$s(D, 2) = 4 \quad e(D, 2) = 5$

According to Equations A, B and C, the third valid matched character string is "EF".

$s(C, 3) = 5 \quad e(C, 3) = 6$ [Equation 17]

$s(D, 3) = 7 \quad e(D, 3) = 8$

Since the end of the input character string is reached, the valid matched character strings are three.

TABLE 18

| C: | AB | CD | EF |
|---|---|---|---|
| | 1 | 2 | 3 |
| D: | AB · | CD · | EF |
| | 1 | 2 | 3 |
| Points | 1,1, | 1,1, | 1,1, |
| | | −⅓ | −⅓ |

The similar character string is "AB●CD●EF" from s (D, 1) to e (D, 3). The degree of similarity=((1*6+(−1/3)*2)/6)= 0.88

TABLE 19

| [Example 10] | |
|---|---|
| | 1234 |
| Input character string C: | ABCD |
| | 12345678910111121314 |
| Part of document D: ... | ABXXXXCDXX X X X X . ... |

Since the first matched character string is "AB", the first valid matched character string is "AB". Since the next matched character string "CD" fails to satisfy Equation D, the valid matched character string is only the first one.

TABLE 20

| C: | ABCD |
|---|---|
| | 1 |
| D: | ABXXXXCDXXXXXX. |
| | 1 |

The similar character string is "AB". The degree of similarity=2/4=0.5

The first non-valid matched character after "A" is "X". The second similar character string is searched after "X".

TABLE 21

| C: | ABCD |
|---|---|
| | 1 |
| D: | ABXXXXCDXXXXXX. |
| | 1 |

Thus, the second similar character string is "CD".

TABLE 22

| [Example 11] | |
|---|---|
| | 1234567 |
| Input character string C: | ABCDEFG |
| | 12345678 |
| Part of document D: ... | ABCCDEFG ... |

The valid matched character strings are two of "ABC" and "CDEFG".

TABLE 23

| C: | ABCDEFG | |
|---|---|---|
| | 1 | |
| | | 2 |
| D: | ABC | CDEFG |
| | 1 | 2 |
| | 1,1,1, | 1,1,1,1 |
| | | −⅙ |

The similar character string is "ABCCDEFG", and the second "C" satisfies Equation E. Thus, the degree of similarity=((1*7+(−1/6)*1)/7)=0.97.

While the ambiguity search according to the second preferred embodiment of the present invention has been described for the calculation of a similarity factor for fixed length chains, it will be easily understood by those skilled in the art that it can be applied to a character string containing variable length chains.

As described above, according to the present invention, document search can be performed in response to a vague request of the user for document search. In addition, since the present invention provides a character string search method for extracting a unique character string without using vocabulary information or grammatical information, there is no need for maintenance of the vocabulary information or grammatical information, so that a search system that can consistently handle new words or phrases can be provided. Furthermore, since the present invention provides a character string search technique for relatively and dynamically extracting a unique character string, there is provided the advantage of being able to extract character strings which are unique to an input document, rather than to extract similar unique character strings from documents of a special type.

What is claimed is:

1. A method for identifying at least one unique character string in an input document which is input into a computer system, said computer system being operable to search one or more documents which are searchably stored in a storage medium, and said unique character string is used as a search string, the method comprising:

associating and managing position information for a position in said searchably stored documents where one or more partial comparison document character strings are extracted from said searchably stored documents;

extracting a partial input character string from said input document, and determining whether said partial input character string is a candidate character string;

identifying a partial comparison document character string which matches at least a part of said candidate character string with a predetermined similarity factor or higher;

identifying position data associated with said partial comparison document character string which matches with said predetermined similarity factor or higher; and recognizing said candidate character string as the unique character string by comparing appearance frequency information of at least a part of said candidate character string appearing in said input document with the position data and evaluating an amount of feature of said candidate character string.

2. A method for identifying at least one unique character string as said search string according to claim 1, wherein in recognizing said candidate character string as the unique character string, said amount of feature is a point allocation for said candidate character string and points are allocated according to the equation:

$$\sum_{J=1}^{Nnumi} (\text{Ncount } ij/\text{Nsize } ij)/\text{Nnum } i \times$$

$$\text{count } i \times \text{Max}_{i,J=1}(\text{Nsize } ij) \Big/ \text{Max}_{i,J}(\text{Ncount } ij)$$

where:

count i=appearance frequency of an i-th candidate character string in the input document;

Ncount i j=appearance frequency of a j-th partial input character string of the i-th candidate character string in the input document;

Nsize i j=position data corresponding to the j-th partial input character string of the i-th candidate character string;

Nnum i=a number of partial input character strings contained in an i-th candidate character string;

Max (Nsize i j)=maximum Nsize i j for all searchably stored documents;

Max (Ncount i j)=maximum Ncount i j for all searchably stored documents.

3. A method for searching for a document to be searched from one or more documents searchably stored in a computer, said document to be searched having a character string similar to a partial input character string existing in an input document input in the computer, the method comprising:

extracting a partial character string from said input document, and determining whether said partial character string is a candidate character string;

evaluating an amount of feature of said candidate character string through comparison between appearance frequency information of at least a part of said candidate character string appearing in said input document and appearance frequency information of at least a part of said candidate character string appearing in said searchably stored documents to recognize said candidate character string as a unique character string; and searching for said document to be searched from said searchably stored documents, wherein said document to be searched has a character string similar to said unique character string.

4. The method for searching for a document according to claim 3, wherein in evaluating the amount of feature of said candidate character string, said amount of feature is a point allocation for said candidate character string and points are allocated according to the equation:

$$\sum_{J=1}^{Nnumi} (\text{Ncount } ij/\text{Nsize } ij)/\text{Nnum } i \times$$

$$\text{count } i \times \text{Max}_{i,J=1}(\text{Nsize } ij) \Big/ \text{Max}_{i,J}(\text{Ncount } ij)$$

where:

count i=appearance frequency of an i-th candidate character string in the input document;

Ncount i j=appearance frequency of a j-th partial input character string of the i-th candidate character string in the input document;

Nsize i j=position data corresponding to the j-th partial input character string of the i-th candidate character string;

Nnum i=a number of partial input character strings contained in an i-th candidate character string;

Max (Nsize i j)=maximum Nsize i j for all searchably stored documents;

Max (Ncount i j)=maximum Ncount i j for all searchably stored documents.

5. A method for identifying at least one unique character string in an input document which is input into a computer system, said computer system being operable to search one or more documents stored in a storage medium, and using said unique character is used as a search string, the method comprising:

extracting a partial input character string from said input document, and determining whether said partial input character string is a candidate character string; and evaluating an amount of feature of said candidate character string through comparison between appearance frequency information of at least a part of said candidate character string appearing in said input document and appearance frequency information of at least a part of said candidate character string appearing in said searchably stored documents to recognize said candidate character string as said unique character string.

6. A method for identifying at least one unique character string as the search string of claim 5, wherein in evaluating the amount of feature, said amount of feature is a point allocation for said candidate character string and points are allocated according to the equation:

$$\sum_{J=1}^{Nnumi} (\text{Ncount } ij / \text{Nsize } ij) / \text{Nnum } i \times$$

$$\text{count } i \times \underset{i,J=1}{\text{Max}}(\text{Nsize } ij) \Big/ \underset{i,J}{\text{Max}}(\text{Ncount } ij)$$

where:
- count i=appearance frequency of an i-th candidate character string in the input document;
- Ncount i j=appearance frequency of a j-th partial input character string of the i-th candidate character string in the input document;
- Nsize i j=position data corresponding to the j-th partial input character string of the i-th candidate character string;
- Nnum i=a number of partial input character strings contained in an i-th candidate character string;
- Max (Nsize i j)=maximum Nsize i j for all searchably stored documents;
- Max (Ncount i j)=maximum Ncount i j for all searchably stored documents.

7. A method for evaluating similarity between a comparison document and an input document which contains a first unique character string and a second unique character string input in a computer, said computer system being operable to search for said comparison document stored in a storage medium, the method comprising:
- calculating a first weight value corresponding to said first unique character string from appearance frequency information of at least a part of said first unique character string of said input document;
- calculating a second weight value corresponding to said second unique character string from appearance frequency information of at least a part of said second unique character string of said input document;
- calculating a first appearance frequency value of at least a part of said first unique character string appearing in said comparison document;
- calculating a second appearance frequency value of at least a part of said second unique character string appearing in said comparison document; and
- calculating a similarity factor between said input document and said comparison document from the first appearance frequency value taking said first weight value into account and the second appearance frequency value taking said second weight value into account.

8. A method for evaluating similarity between a comparison document and a unique character string input in a computer system, said computer system being operable to search for said comparison document stored in a storage medium, the method comprising:
- calculating a weight value corresponding to said unique character string from appearance frequency information of at least a part of said unique character string appearing in an input document; and
- calculating a similarity factor between said unique character string and said comparison document from the appearance frequency information of at least a part of said unique character string appearing in said comparison document and said weight value.

9. An apparatus for identifying at least one unique character string in an input document which is input into a computer system, said computer system containing one or more documents which are searchably stored by the computer, the apparatus comprising:
- a storage device for storing a position information file which associates and manages position information for a position in said searchably stored documents where one or more partial comparison document character strings are extracted from said searchably stored documents;
- means for extracting a candidate character string from said input document;
- means for identifying a partial comparison document character string which matches part of said candidate character string with a predetermined similarity factor or higher;
- means for identifying position data which is associated to said partial comparison document character string having the predetermined similarity factor or higher in said position information file; and
- means for recognizing said candidate character string as the unique character string by comparing appearance frequency information of at least a part of said candidate character string appearing in said input document with said position information, and evaluating an amount of feature of said candidate character string.

10. The apparatus for identifying at least one unique character string in an input document according to claim 9, wherein in said means for recognizing the candidate string as the unique string, said amount of feature is a point allocation for said candidate character string and points are allocated according to the equation:

$$\sum_{J=1}^{Nnumi} (\text{Ncount } ij / \text{Nsize } ij) / \text{Nnum } i \times$$

$$\text{count } i \times \underset{i,J=1}{\text{Max}}(\text{Nsize } ij) \Big/ \underset{i,J}{\text{Max}}(\text{Ncount } ij)$$

where:
- count i=appearance frequency of an i-th candidate character string in the input document;
- Ncount i j=appearance frequency of a j-th partial input character string of the i-th candidate character string in the input document;
- Nsize i j=position data corresponding to the j-th partial input character string of the i-th candidate character string;
- Nnum i=a number of partial input character strings contained in an i-th candidate character string;
- Max (Nsize i j)=maximum Nsize i j for all searchably stored documents;
- Max (Ncount i j)=maximum Ncount i j for all searchably stored documents.

11. An apparatus for searching for a document to be searched from one or more documents searchably stored in a computer, said document to be searched having a character string similar to a partial input character string which exists in an input document input in the computer, the apparatus comprising:
- an input device for identifying said input document and instructing execution of a search;

means for detecting from said input device that said input document is identified and that said instruction of a search is input;

means for extracting a candidate character string from said input document in response to the detection that said input document is identified and that said instruction of a search is input;

means for calculating an amount of feature of said candidate character string through comparison between appearance frequency information at least a part of said candidate character string appearing in said input document and appearance frequency information of at least a part of said candidate character string appearing in said searchably stored documents;

means for determining whether said candidate character string is a unique character string by evaluating said amount of feature;

means for searching for the document to be searched from said searchably stored documents, wherein said document to be searched has a character string similar to said unique character string; and a display device for displaying the document to be searched having a character string similar to said unique character string.

12. An apparatus for searching for a document according to 11, wherein in said means for determining the unique character string, said amount of feature is a point allocation for said candidate character string and points are allocated according to the equation:

$$\sum_{J=1}^{Nnumi} (\text{Ncount } ij/\text{Nsize } ij)/\text{Nnum } i \times \text{count } i \times \text{Max}_{i,J=1}(\text{Nsize } ij) \Big/ \text{Max}_{i,J}(\text{Ncount } ij)$$

where:

count i=appearance frequency of an i-th candidate character string in the input document;

Ncount i j=appearance frequency of a j-th partial input character string of the i-th candidate character string in the input document;

Nsize i j=position data corresponding to the j-th partial input character string of the i-th candidate character string;

Nnum i=a number of partial input character strings contained in an i-th candidate character string;

Max (Nsize i j)=maximum Nsize i j for all searchably stored documents;

Max (Ncount i j)=maximum Ncount i j for all searchably stored documents.

13. An apparatus for identifying at least one unique character string in an input document which is input into a computer system, said computer system containing one or more documents which are searchably stored by the computer, and said unique character string is used as a search string, the apparatus comprising:

means for extracting a candidate character string from said input document; and means for determining whether said candidate character string is a unique character string by evaluating an amount of feature of said candidate character string through comparison between appearance frequency information of at least a part of said candidate character string appearing in said input document and appearance frequency information of at least a part of said candidate character string appearing in said searchably stored documents.

14. An apparatus for evaluating similarity between a comparison document and an input document containing a unique character string input into a computer system, said computer system containing a comparison document searchably stored by the computer, the apparatus comprising:

means for calculating a weight value corresponding to said unique character string from appearance frequency information of at least a part of said unique character string appearing in said input document; and means for calculating a similarity factor between said input document and said comparison document from the appearance frequency information of at least a part of said unique character string appearing in said comparison document and said weight value.

15. A storage medium readable by a computer for storing a program operable to identify a document input into a computer system based on an input document, said computer system containing one ore more documents which are searchably stored by the computer, the program comprising:

program code means for directing said computer to extract a partial character string from said input document and determining whether the partial character string is a candidate character string; and program code means for directing said computer to determine whether the candidate character string is a unique character string by evaluating an amount of feature of said candidate character string through comparison between appearance frequency information of at least a part of said candidate character string appearing in said input document and appearance frequency information of at least a part of said candidate character string appearing in said searchably stored documents.

16. The storage medium readable by a computer for storing a program operable to identify a document according to claim 15, wherein in said program code means for determining whether the candidate character string is a unique character string, said amount of feature is a point allocation for said candidate character string and points are allocated according to the equation:

$$\sum_{J=1}^{Nnumi} (\text{Ncount } ij/\text{Nsize } ij)/\text{Nnum } i \times \text{count } i \times \text{Max}_{i,J=1}(\text{Nsize } ij) \Big/ \text{Max}_{i,J}(\text{Ncount } ij)$$

where:

count i=appearance frequency of an i-th candidate character string in the input document;

Ncount i j=appearance frequency of a j-th partial input character string of the i-th candidate character string in the input document;

Nsize i j=position data corresponding to the j-th partial input character string of the i-th candidate character string;

Nnum i=a number of partial input character strings contained in an i-th candidate character string;

Max (Nsize i j)=maximum Nsize i j for all searchably stored documents;

Max (Ncount i j)=maximum Ncount i j for all searchably stored documents.

17. The storage medium readable by a computer according to claim 15 further comprising:

program code means for searching for a document to be searched from said searchably stored documents, wherein said document to be searched has a character string similar to said unique character string.

18. A storage medium readable by a computer for storing a program which is operable to evaluate similarity between a comparison document and an input document containing a unique character string input into a computer system, said comparison document being searchably stored by the computer, the program comprising:

program code means for directing said computer to calculate a weight value corresponding to said unique character string from appearance frequency information of at least a part of said unique character string appearing in said input document; and program code means for directing said computer to calculate a similarity factor between said input document said comparison document from the appearance frequency information of at least a part of said unique character string appearing in said comparison document and the weight value.

19. A medium readable by a computer for storing a program operable to identify at least one unique character string in an input document which is input into a computer system, said computer system being operable to search one or more documents which are searchably stored in a storage medium, and said unique character string is used as a search string, the program comprising:

program code means for associating and managing position information for a position in said searchably stored documents where one or more partial comparison document character strings are extracted from said searchably stored documents;

program code means for extracting a partial input character string from said input document, and determining whether said partial input character string is a candidate character string;

program code means for identifying a partial comparison document character string which matches at least a part of said candidate character string with a predetermined similarity factor or higher;

program code means for identifying position data associated with said partial comparison document character string which matches with said predetermined similarity factor or higher; and program code means for recognizing said candidate character string as the unique character string by comparing appearance frequency information of at least a part of said candidate character string appearing in said input document with the position data and evaluating an amount of feature of said candidate character string.

* * * * *